(12) United States Patent
Yano et al.

(10) Patent No.: US 9,271,514 B2
(45) Date of Patent: Mar. 1, 2016

(54) FROZEN DESSERT AND FROZEN DESSERT MATERIAL

(75) Inventors: Hiroyuki Yano, Uji (JP); Kentaro Abe, Uji (JP); Takeshi Nakatani, Uji (JP); Yasuo Kase, Inukami-gun (JP); Shojiro Kikkawa, Inukami-gun (JP); Yuka Onishi, Inukami-gun (JP)

(73) Assignees: Kyoto University, Kyoto (JP); Nissei Company, Ltd., Osaka (JP)

( * ) Notice: Subject to any disclaimer, the term of this patent is extended or adjusted under 35 U.S.C. 154(b) by 0 days.

(21) Appl. No.: 14/344,158

(22) PCT Filed: Sep. 12, 2012

(86) PCT No.: PCT/JP2012/073344
§ 371 (c)(1),
(2), (4) Date: Mar. 11, 2014

(87) PCT Pub. No.: WO2013/039110
PCT Pub. Date: Mar. 21, 2013

(65) Prior Publication Data
US 2014/0342075 A1 Nov. 20, 2014

(30) Foreign Application Priority Data

Sep. 14, 2011 (JP) ................................. 2011-200885
Sep. 6, 2012 (JP) ................................. 2012-196178

(51) Int. Cl.
| | |
|---|---|
| A23G 9/00 | (2006.01) |
| A23K 1/12 | (2006.01) |
| A23G 9/42 | (2006.01) |
| C08L 1/02 | (2006.01) |
| A23G 9/04 | (2006.01) |
| A23G 9/32 | (2006.01) |
| A23G 9/44 | (2006.01) |
| A23G 9/52 | (2006.01) |

(52) U.S. Cl.
CPC .. *A23G 9/42* (2013.01); *A23G 9/04* (2013.01); *A23G 9/32* (2013.01); *A23G 9/44* (2013.01); *A23G 9/52* (2013.01); *C08L 1/02* (2013.01); *A23V 2002/00* (2013.01)

(58) Field of Classification Search
CPC ............. C08L 1/02; C08L 1/286; C08L 1/28; C08L 1/08; C08L 1/10; C08L 1/12; A23V 2250/5108; A23V 2250/51082; A23G 9/42; A23G 9/04; A23G 9/44; A23G 9/52; A23G 9/32
USPC ........................................ 426/565, 567, 615
See application file for complete search history.

(56) References Cited

U.S. PATENT DOCUMENTS

| | | | | |
|---|---|---|---|---|
| 4,388,352 | A | * | 6/1983 | Allan et al. .................... 427/391 |
| 5,487,419 | A | * | 1/1996 | Weibel ............................. 162/9 |
| 6,602,994 | B1 | * | 8/2003 | Cash et al. ..................... 536/30 |
| 2006/0029710 | A1 | * | 2/2006 | McPherson et al. .......... 426/565 |

FOREIGN PATENT DOCUMENTS

| | | | |
|---|---|---|---|
| EP | 1538257 | A1 | 6/2005 |
| JP | Sho 54-138157 | A | 10/1979 |
| JP | 59042850 | A * | 3/1984 |
| JP | S59-42850 | A | 3/1984 |
| JP | Sho 59-042850 | A | 3/1984 |
| JP | Hei 4-144646 | A | 5/1992 |
| JP | Hei 5-276875 | A | 10/1993 |
| JP | Hei 6-178659 | A | 6/1994 |
| JP | 2008-169497 | A | 7/2008 |
| WO | 2007047895 | A2 | 4/2007 |
| WO | 2008046698 | A1 | 4/2008 |
| WO | 2008046732 | A1 | 4/2008 |

OTHER PUBLICATIONS

Vismara et al., Alpha cellulose from industrial and agricultural renewable sources like short flax fibres, ears of corn and wheat-straw and its transformation into cellulose acetates www.rsc.org/materials Journal of Materials Chemistry, J. Mater. Chem., 2009, 19, 8678-8686.*
Abe et al., "Obtaining Cellulose Nanofibers with a Uniform Width of 15 nm from Wood," Biomacromolecules, 2007, vol. 8, pp. 3276-3278.
Iwamoto et al., "The Effect of Hemicelluloses on Wood Pulp Nanofibrillation and Nanofiber Network Characteristics," Biomacromolecules, 2008, vol. 9, pp. 1022-1026.
JPO, Notice of Reason For Refusal issued in corresponding Japanese application No. 2012-196178, mailed Aug. 27, 2013.
JPO, Decision To Grant A Patent issued in corresponding Japanese application No. 2012-196178, mailed Jan. 7, 2014.
Isamoto et al., "The Effect of Hemicelluloses on Wood Pulp Nanofibrillation and Nanofiber Network Characteristics," Biomacromolecules, 2008, vol. 9, No. 3, pp. 1022-1026.
Abe et al., "Obtaining Cellulose Nanofibers with a Uniform Width of 15 nm from Wood," Biomacromolecules, 2007, vol. 8, No. 10, pp. 3276-3278.
JPO, International Search Report issued in corresponding international application No. PCT/JP2012/073344, mailed Dec. 11, 2012.
New Zealand Intellectual Property Office, Further Examination Report from corresponding Application No. 621519, dated Feb. 3, 2015.
European Patent Office, Supplementary European Search Report from corresponding Application No. EP12831618, dated Jun. 25, 2015.

* cited by examiner

*Primary Examiner* — Jyoti Chawla
(74) *Attorney, Agent, or Firm* — Stites & Harbison, PLLC; Terry L. Wright; Jeffrey A. Haeberlin

(57) ABSTRACT

A frozen dessert improved in shape retention without an adverse effect on the properties of the frozen dessert such as viscosity, texture and flavor is provided.
The frozen dessert contains plant-derived microfibrillated cellulose.

12 Claims, 2 Drawing Sheets

FROZEN DESSERT AND FROZEN DESSERT MATERIAL

TECHNICAL FIELD

The present invention relates to a frozen dessert and a frozen dessert material.

BACKGROUND ART

In general, a "frozen dessert" is defined as "frozen or chilled confectionery such as jelly, ice cream and sherbet" (Kojien, fourth edition, Iwanami Shoten, 1991). In the present application, however, a 'frozen dessert' is defined as follows.

That is, the 'frozen dessert' in the present application is broadly classified into "hard ice cream" and "soft ice cream" as shown in Table 1.

The "hard ice cream" is a frozen dessert which is in the form of an end product obtained through a 'hardening process' in a production flow to be described later and which is distributed while in a frozen state at approximately −20° C., and placed in a freezing cabinet and sold as a commodity at a store (commercial product). The "hard ice cream" is categorized into "ice creams" and "ice confections".

The "soft ice cream" is a frozen dessert which is commonly called soft-serve ice cream and which is not distributed but is made with a frozen dessert production apparatus without a 'hardening process' in a store and sold at the store face to face to consumers as a prepared food product at approximately −4 to −10° C. directly taken out of the frozen dessert production apparatus. The "soft ice cream" is also categorized into "ice creams" and "ice confections".

Furthermore, under the hard ice cream and the soft ice cream (hereinafter, abbreviated as soft cream), the "ice creams" are categorized into an ice cream standard, an ice milk standard and a lacto-ice standard based on the standards for ice creams specified under a ministerial ordinance according to their compositions such as milk.

Likewise, under the hard ice cream and the soft cream, the "ice confections" refer to frozen desserts containing less than 3% of milk solid. The ice confections are further categorized into fat-containing ice confections and fat-free ice confections as shown in Table 1.

It is noted that some products analogous to soft cream have been recently offered to consumers, which are a frozen dessert put in small-sized containers and distributed in the same manner as in the hard ice cream, and then forcibly defrosted in a dedicated defrosting chamber in a store until it is −8 to −12° C., extruded while each container is compressed and deformed with a dedicated extruder and served in a well-known soft cream form (twisted high). However, these products shall be categorized into the hard ice cream since they are obtained through a hardening process and they are distributed at −20° C.

TABLE 1

| Frozen Dessert | Hard Ice Cream | Ice Creams | Ice Cream Standard (Milk Solid: ≥15.0%, Milk Fat: ≥8.0%) Ice Milk Standard (Milk Solid: ≥10.0%, Milk Fat: ≥3.0%) Lact-ice Standard (Milk Solid: ≥3.0%) |
| --- | --- | --- | --- |
| | | Ice Confections (Milk Solid: <3.0%) | Fat-containing Ice Confections Fat-free Ice Confections |
| | Soft Ice Cream | Ice Creams | Ice Cream Standard (Milk Solid: ≥15.0%, Milk Fat: ≥8.0%) Ice Milk Standard (Milk Solid: ≥10.0%, Milk Fat: ≥3.0%) Lact-ice Standard (Milk Solid: ≥3.0%) |
| | | Ice Confections (Milk Solid: <3.0%) | Fat-containing Ice Confections Fat-free ice confections |

Consumers may eat the hard ice cream at the point of sale immediately after the purchase, or may take it home by maintaining its frozen state with dry ice or the like, keep it in a freezer and eat it at an appropriate time. Since the hard ice cream immediately after it is taken out of the freezer is frozen very hard, the hard ice cream is generally eaten after the temperature of the product is approximately −10° C., at which it is soft enough to eat, and it thaws of its own accord by leaving it at room temperature.

However, the thawing time taken until the hard ice cream is soft enough to eat varies greatly depending on the surrounding environment. As time goes by, the surface of the hard ice cream may start melting earlier than the other part and impair a pleasant dry feeling, or an edge portion of the hard ice cream twisted high into a sharp and beautiful shape may run down and damage the shape, or the hard ice cream may melt and fall like a snowslide. Thus, consumers often miss the timing to eat the hard ice cream while it is in an ideal state.

When a small child or an elderly person who cannot quickly eat up a frozen dessert which is cold as being below zero encounters the above-described situations, the frozen dessert starts melting completely and dirties their hands or clothes, or melts and falls like a snowslide and drips onto the floor. Such situations are often observed.

The same is true of soft cream which is made at the point of sale without a hardening process, served on an edible container such as a cone cup and sold face to face while in a soft state at approximately −4 to −10° C. Consumers eat the soft cream in or around the store while holding the container such as a cone cup. Then, the soft cream melts with time and dirties hands and clothes of the consumers, or even worse the soft cream melts and falls like a snowslide and drips onto the floor, necessitating cleaning. Such situations occur more often when the ambient temperature is high, in particular.

In these frozen desserts, which melt with time unless they are kept in a frozen state as described above, maintaining a pleasant dry feeling by delaying start of melting as much as possible, maintaining a beautiful shape by delaying melting and falling as much as possible and maintaining a beautiful appearance perceptually appealing attractive taste (reinforcing shape retention for holding a predetermined shape) lead to improvement of product's value (product's life) and thus are very important objects as well as other properties such as flavor and texture.

As a conventional method for the reinforcement of the shape retention of frozen desserts, addition of a stabilizer and an emulsifier is known. Examples of the stabilizer include hydrophilic polysaccharides extracted from seaweed, vegetable seeds, microorganisms or the like; insoluble polysaccharides such as microcrystalline cellulose; and synthetic stabilizers such as carboxymethylcellulose (CMC). Examples of the emulsifier include low HLB emulsifiers such as unsaturated fatty ester.

In addition, Patent Document 1 reports that use of microcrystalline cellulose, carrageenan and waxy corn starch as stabilizers allows enhancement of the liquid stability of a liquid soft cream mix before the freezing and achievement of soft cream having good shape retention and superior drip resistance after the freezing for a long period of time. Here, it should be noted that microcrystalline cellulose is clearly distinguished from microfibrillated cellulose used in the present invention to be described later (see Patent Document 2, for example).

RELATED ART DOCUMENTS

Patent Documents

Patent Document 1: Japanese Unexamined Patent Publication No. HEI 5 (1993)-276875
Patent Document 2: Japanese Unexamined Patent Publication No. HEI 6 (1994)-178659

SUMMARY OF THE INVENTION

Problems to be Solved by the Invention

The present inventors have made intensive studies for prolong the time from when a consumer is about to eat a frozen dessert until when melting, falling and loss of shape start, that is, extending the period of time a frozen dessert can retain its shape (improvement of the shape retention). As a result, the present inventors have reached the following findings.

The improvement of the shape retention of a frozen dessert with stabilizers can be achieved by increasing the amount of the stabilizers to add. However, addition of the stabilizers to the extent that an expected effect is achieved makes the texture of the frozen dessert pasty, significantly impairing the flavor of the frozen dessert.

The improvement of the shape retention of a frozen dessert with low HLB emulsifiers can be also achieved by increasing the amount of the emulsifiers to add. However, the emulsifiers have a distinctive taste and odor, and addition of the emulsifiers to the extent that an expected effect is achieved therefore reduces the flavor of the frozen dessert. Besides, the low HLB emulsifiers induce demulsification, and churning is easily caused during the freezing. Here, the churning refers to the situation where a plurality of fat globules are put together to grow to lumps and some of the lumps (butter particles) are so large that they are visible. The churning can be a cause of reduction of melt-in-mouth characteristics and roughness, significantly impairing the texture of the frozen dessert.

Means for Solving the Problems

The present inventors have found that it is possible to sufficiently extend the shape holding time (shape retention) of a frozen dessert to the expected extent without an adverse effect on the other properties by including plant-derived microfibrillated cellulose having the following parameters in a material mix of the frozen dessert to reach the present invention.

The 'microfibrillated cellulose' in the present invention, which will be described later, refers to two types of microfibrillated cellulose distinctly different in degree of fibrillation according to each parameter described later. The two types of microfibrillated cellulose are distinctively referred to as "microfibrillated cellulose D standard", which is less fibrillated "microfibrillated cellulose", and "microfibrillated cellulose K standard", which is more fibrillated "microfibrillated cellulose".

Thus, according to the present invention, there is provided a frozen dessert containing plant-derived microfibrillated cellulose.

According to another aspect of the present invention, there is provided a frozen dessert containing plant-derived microfibrillated cellulose, wherein the microfibrillated cellulose has at least one of the parameters:
(1) a specific surface area of 100 $m^2/g$ or larger; and
(2) a water retention of 300% or more.

According to still another aspect of the present invention, there is provided a frozen dessert containing plant-derived microfibrillated cellulose, wherein the microfibrillated cellulose has at least one of the parameters:
(A) a rate of sedimentation of 1000 ml/g or more when in the form of a water dispersion having a microfibrillated cellulose content of 0.05% by weight; and
(B) a light transmission of 30% or more at a wavelength of 600 nm when in the form of a water dispersion having a microfibrillated cellulose content of 0.02% by weight.

According to still another aspect of the present invention, there is provided a frozen dessert containing plant-derived microfibrillated cellulose, wherein more preferably, the microfibrillated cellulose has at least one of the parameters:
(1) a specific surface area of 150 $m^2/g$ or larger; and
(2) a water retention of 500% or more.

According to still another aspect of the present invention, there is provided a frozen dessert containing plant-derived microfibrillated cellulose, wherein still more preferably, a water dispersion containing the microfibrillated cellulose has at least one of the parameters:
(A) a rate of sedimentation of 1500 ml/g or more when in the form of a water dispersion having a microfibrillated cellulose content of 0.05% by weight; and
(B) a light transmission of 40% or more at a wavelength of 600 nm when in the form of a water dispersion having a microfibrillated cellulose content of 0.02% by weight.

According to still another aspect of the present invention, there is provided a frozen dessert material for the above-mentioned frozen dessert, wherein the material contains the plant-derived microfibrillated cellulose.

According to still another aspect of the present invention, there is provided a method for producing a frozen dessert, including use of the frozen dessert material.

Effects of the Invention

The frozen dessert material of the present invention allows production of a frozen dessert that has a shape holding (shape retention) time sufficiently extended to the expected extent without an adverse effect on the properties of the frozen dessert such as thermal physical property change, viscosity, texture and flavor.

Of various frozen desserts, in particular, a type of frozen dessert which is served high on a cone cup, twisted upward into the shape of so-called soft-serve ice cream and a type of frozen dessert which comes on a stick (ice cream bar) (regardless of the categories of frozen desserts; hard ice cream, soft cream or ice confection) melt, fall and loose shape with time, and these problems are desired to be delayed as much as possible. Such types of frozen dessert are therefore most suitable as embodiments of the present invention According to the present invention, it is possible to obtain an expected shape retention improvement effect by addition of a small amount of plant-derived microfibrillated cellulose, and therefore it is not necessary to change the composition of the material mix for a frozen dessert which has been precisely adjusted so that good flavor and texture can be achieved. As a result, liquid state deterioration such as separation, thickening and coagulation of the material mix of the frozen dessert is less likely to occur, and the properties of the frozen dessert are not adversely affected besides the shape retention improvement.

MODE FOR CARRYING OUT THE INVENTION

<Plant-Derived Microfibrillated Cellulose>

Figure 1:
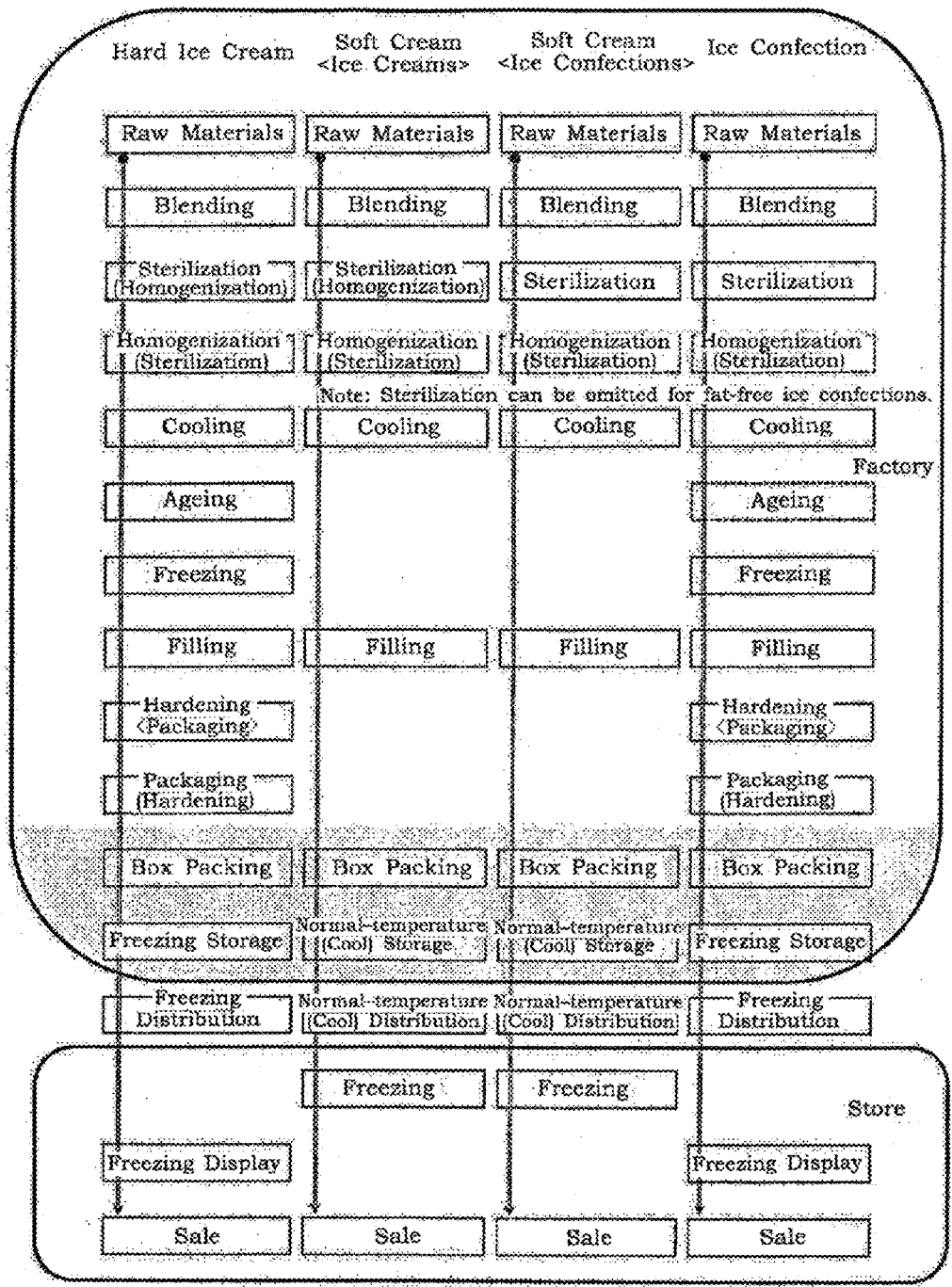
FIG. 1 is a flow diagram showing processes of production, distribution and sale of frozen desserts of the present invention.

In the present invention, a "frozen dessert" is defined as described above (see Table 1).

The frozen dessert of the present invention is characterized by containing plant-derived microfibrillated cellulose having the following parameters so that the shape retention of the frozen dessert is improved without an adverse effect on the properties of the frozen dessert such as viscosity, texture and flavor, and on the properties of the frozen dessert material such as thermal physical property change and long-term storage stability. The microfibrillated cellulose is characterized by the following parameters.

<Parameters for Microfibrillated Cellulose Itself>

Specifically, the microfibrillated cellulose in the present invention has at least one of the parameters:
(1) a specific surface area of 100 $m^2/g$ or larger and preferably 150 $m^2/g$ or larger; and
(2) a water retention of 300% or more and preferably 500% or more. Preferably, the microfibrillated cellulose in the present invention has both of the parameters (1) and (2).

The parameters (1) and (2) are for the microfibrillated cellulose itself and important factors for the improvement of the shape retention of the frozen dessert.

In the present invention, the specific surface area is 100 $m^2/g$ or larger, preferably 150 $m^2/g$ or larger, and more preferably 200 to 350 $m^2/g$. In the present invention, the water retention is 300% or more, preferably 500% or more, and more preferably 8500 to 36000%. It is difficult to obtain a satisfactory shape retention improvement effect from the microfibrillated cellulose if the specific surface area is smaller than 100 $m^2/g$ or the water retention is less than 300%.

In the present invention, the specific surface area is determined as follows. A sample of a water dispersion of the microfibrillated cellulose is collected, and the water in the sample is replaced with ethanol, and then with tert-butyl alcohol. Thereafter, the sample is freeze-dried, and the specific surface area of the microfibrillated cellulose is measured in accordance with the BET method with BELSORP-mini II produced by BEL Japan, Inc. The determination of the specific surface area confirms that the more the number of fibers of the microfibrillated cellulose per unit weight is (the smaller the diameter of the fibers is), the larger the specific surface area is.

In the present invention, the water retention is a value determined as follows. Into a metal cup filter provided with two sheets of qualitative filter paper No. 101 produced by Advantech Toyo kabushiki Kaisha, 50 g of a water dispersion of microfibrillated cellulose obtained by dispersing microfibrillated cellulose in water so as to have a microfibrillated cellulose content of 0.5% by weight was poured, dehydrated using a centrifuge at a centrifugal force of 1500 G and at a room temperature of 25° C. for 15 minutes. The sample dehydrated is weighed, and then the sample is dried and weighed to calculate the water retention according to the equation shown below. The determination of the water retention also confirms that the more the number of fibers of the microfibrillated cellulose per unit weight is, the larger the water retention is.

Water retention (%)={(weight of sample dehydrated−weight of sample dried)/weight of sample dried}×100

<Parameters for Water Dispersion of Microfibrillated Cellulose>

The microfibrillated cellulose in the present invention may have at least one of the parameters:
(A) a rate of sedimentation of 1000 ml/g or more and preferably 1500 ml/g or more when in the form of a water dispersion having a microfibrillated cellulose content of 0.05% by weight; and
(B) a light transmission of 30% or more and preferably 40% or more at a wavelength of 600 nm when in the form of a water dispersion having a microfibrillated cellulose content of 0.02% by weight. Preferably, the microfibrillated cellulose in the present invention has both of the parameters (A) and (B).

The parameters (A) and (B) are for the water dispersion of the microfibrillated cellulose and important factors for the improvement of the shape retention of the frozen dessert.

In the present invention, the rate of sedimentation is 1000 ml/g or more, preferably 1500 ml/g or more, and more preferably 1800 to 2000 ml/g. In the present invention, the light transmission is 30% or more, preferably 40% or more, and more preferably 70% or more.

In the present invention, the rate of sedimentation is a value determined as follows. In a measuring cylinder, 100 ml of a water dispersion of microfibrillated cellulose obtained by dispersing microfibrillated cellulose in water so as to have a microfibrillated cellulose content of 0.05% by weight is allowed to rest for 1 hour, and then the volume of the suspended part is measured to calculate the rate of sedimentation according to the equation shown below. The determination of the rate of sedimentation also confirms that the more the number of fibers being measured per unit weight is, the larger the rate of sedimentation is.

Rate of sedimentation (ml/g)=suspension volume (ml)/solid content (g)

In the present invention, the light transmission is a value determined as follows. A water dispersion of microfibrillated cellulose obtained by dispersing microfibrillated cellulose in water so as to have a microfibrillated cellulose content of 0.02% by weight is put in a standard glass cell and measured for the light transmittance at a wavelength of 600 nm with a spectrophotometer using water as blank. The determination of the light transmittance confirms that the more the number of fibers of the microfibrillated cellulose per unit weight is, the larger the light transmittance is.

In general, the more the number of fibers per unit weight is, the finer and the more complexly intertwined three-dimensional network structure the fibers can form. Having at least one of the parameters (1) and (2) or of the parameters (A) and (B) when in the form of a water dispersion, the microfibrillated cellulose can form an extremely fine and complexly intertwined three-dimensional network structure. A small amount of microfibrillated cellulose uniformly contained in the frozen dessert material can dramatically improve the shape retention of the frozen dessert. Besides, the microfibrillated cellulose only has an effect of improving the shape retention and does not have any adverse effect on the properties of the frozen dessert.

The microfibrillated cellulose referred to is categorized into two types of microfibrillated cellulose having a significant difference in the melting and falling delaying effect according to the degree of fibrillation. The two types of microfibrillated cellulose are distinctively referred to as "microfibrillated cellulose D standard", which is less fibrillated, and "microfibrillated cellulose K standard", which is more fibrillated.

They are defined as follows according to the parameters as defined above.

The "microfibrillated cellulose D standard" (hereinafter, may be referred to as microfibrillated cellulose (D standard)) is defined as microfibrillated cellulose having at least one of the parameters:
(1) a specific surface area of 100 $m^2/g$ or larger and smaller than 150 $m^2/g$; and
(2) a water retention of 300% or more and less than 500%, or as microfibrillated cellulose having, when in the form of a water dispersion containing the microfibrillated cellulose, at least one of the parameters:
(A) a rate of sedimentation of 1000 ml/g or more and less than 1500 ml/g when in the form of a water dispersion having a microfibrillated cellulose content of 0.05% by weight; and
(B) a light transmission of 30% or more and less than 40% at a wavelength of 600 nm when in the form of a water dispersion having a microfibrillated cellulose content of 0.02% by weight.

The "microfibrillated cellulose K standard" (hereinafter, may be referred to as microfibrillated cellulose (K standard)) is defined as microfibrillated cellulose having at least one of the parameters:
(1) a specific surface area of 150 $m^2/g$ or larger; and
(2) a water retention of 500% or more, or as microfibrillated cellulose having, when in the form of a water dispersion containing the microfibrillated cellulose, at least one of the parameters:
(A) a rate of sedimentation of 1500 ml/g or more when in the form of a water dispersion having a microfibrillated cellulose content of 0.05% by weight; and
(B) a light transmission of 40% or more at a wavelength of 600 nm when in the form of a water dispersion having a microfibrillated cellulose content of 0.02% by weight.

As described later, the effect of improving the shape retention of the frozen dessert of the more fibrillated "microfibrillated cellulose K standard" is greater than that of the less fibrillated "microfibrillated cellulose D standard".

The microfibrillated cellulose is not limited as long as it has at least one of the parameters (1) and (2) or of the parameters (A) and (B) when in the form of a water dispersion of the microfibrillated cellulose. The plant to be a material of the microfibrillated cellulose is not particularly limited, and the method for the preparation of the microfibrillated cellulose is not particularly limited, either.

As a representative method for the preparation of the microfibrillated cellulose, a method by fibrillating a commonly known never-dried pulp may be mentioned, for example.

Here, an example of the preparation of microfibrillated cellulose derived from a never-dried pulp will be described. First, a raw wood material such as a broadleaf tree and a coniferous tree is processed into timber by removing its bark, the timber is pulverized into wood flour, and the wood flour is classified to have a predetermined size (for example, 50 µm×250 µm). Subsequently, the classified wood flour is immersed in an organic solvent for defatting. The defatted wood flour is immersed in a sodium chlorite solution to remove lignin. The wood flour after the lignin removal is optionally immersed in an alkaline aqueous solution (for example, a potassium hydroxide solution or a sodium hydroxide solution) to remove a certain amount of hemicellulose. The fiber preparation after the hemicellulose removal is washed with water. The fiber preparation swelled after the washing with water is a never-dried pulp. In the present invention, a predetermined amount of hemicellulose may be contained in the never-dried pulp, which will be described later in detail.

Then, the never-dried pulp is fibrillated with a fibrillation apparatus (a grinder, for example) to give wet microfibrillated cellulose. The fibrillation conditions of the fibrillation apparatus are set so that the microfibrillated cellulose to be obtained will have at least one of the parameters (1) and (2) or of the parameters (A) and (B) when in the form of a water dispersion of the microfibrillated cellulose.

This preparation method is commonly known, which is useful in preparation of microfibrillated cellulose derived from a never-dried pulp, and disclosed in Japanese Unexamined Patent Publication No. 2010-7010, for example. The microfibrillated cellulose derived from a never-dried pulp may be used as a water dispersion of the microfibrillated cellulose obtained by dispersing the microfibrillated cellulose in water.

Here, an example of the preparation of microfibrillated cellulose derived from a dried pulp will be described. The above-mentioned fiber preparation is obtained in the same manner as in the example of the preparation of microfibrillated cellulose derived from a never-dried pulp. Thereafter, the fiber preparation is dried to give a dried pulp, and the dried pulp is fibrillated to give microfibrillated cellulose. The microfibrillated cellulose derived from a dried pulp may also be used as a water dispersion of the microfibrillated cellulose obtained by dispersing the microfibrillated cellulose in water.

In the frozen dessert of the present invention, the microfibrillated cellulose may be prepared so as to satisfy (I) or (II), or a combination of (I) and (II) described below. As a result, it is possible to obtain a frozen dessert further enhanced in shape retention. In particular, such an effect of (II) is significant.

(I) The microfibrillated cellulose preferably has an α-cellulose content of 50% or more. The α-cellulose content may be 100%. In this case, however, the preparation time of the microfibrillated cellulose is longer and the preparation cost is increased.

In the above-described examples of the preparation of the microfibrillated cellulose, hemicellulose is removed so that the α-cellulose content will be 50% or more. In this case, the α-cellulose content (hemicellulose content) in the microfibrillated cellulose can be adjusted by adjusting the period of time for immersing the wood flour after the lignin removal in an alkaline aqueous solution or the concentration of the alkaline aqueous solution. The α-cellulose content in the microfibrillated cellulose can be determined using a commonly known method as a component that does not dissolve in 17.5% by weight sodium hydroxide solution.

(II) The microfibrillated cellulose may be chemically modified with a substituent including —$CH_2COO$—. That is, the microfibrillated cellulose may be subjected to carboxymethylation (hereinafter abbreviated as CM). In this case, the CM can be performed by a commonly known method before the fibrillation in the above-described process. Here, the degree of etherification (DS) may be 0.01 to 0.50, for example. The substituent including —CH$_2$COO— can be confirmed by a commonly known method, for example, by analyzing the infrared absorption spectrum of the microfibrillated cellulose.

The melting and falling delaying effect of the microfibrillated cellulose subjected to the CM is increased by moderately increasing the degree of etherification. However, if the degree of etherification is increased too much, for example, if the degree of etherification exceeds 0.5, the amount of chemicals such as sodium monochloroacetate and sodium hydroxide to be used in the reaction is increased, and therefore the cellulose is damaged and the crystallinity thereof is impaired. As a result, the solubility of the cellulose molecule will increase, and a sufficient network structure cannot be formed. Accordingly, a sufficient melting and falling delaying effect of the soft cream cannot be obtained.

The microfibrillated cellulose content in the frozen dessert is not limited as long as the shape retention improvement effect can be sufficiently exerted on the frozen dessert without an adverse effect on the properties of the frozen dessert and on the physical properties of the frozen dessert material besides the shape retention improvement effect. In a soft cream, for example, the most suitable microfibrillated cellulose content is 0.05 to 1.0% by weight in the case of microfibrillated cellulose not subjected to the CM and 0.01 to 1.0% by weight in the case of microfibrillated cellulose subjected to the CM.

<Frozen Dessert Material>

In the present invention, the raw materials other than the microfibrillated cellulose included in the frozen dessert material are selected from raw materials commonly used for the frozen desserts such as, for example, water, milk, dairy products, sweeteners, oils and fats, stabilizers, emulsifiers, flavorings, salt, fruit juices, and fruity flesh as appropriate according to the type of the frozen dessert.

The milk is not particularly limited, and examples thereof include cow milk and defatted milk (skimmed milk). The dairy products are not particularly limited, and examples thereof include skim milk powder, modified milk powder, cream, condensed milk and fermented milk. The milk and the dairy products may be used independently, or two or more kinds may be used in combination.

The sweeteners are not particularly limited and examples thereof include sugars such as sugar (sucrose, sucrose), grape sugar (glucose), fruit sugar (fructose), malt sugar (maltose), milk sugar (lactose), trehalose, starch syrup and isomerized glucose syrup; sugar alcohols such as sorbitol, xylitol, maltitol, erythritol and lactitol; and non-sugar sweeteners such as aspartame, sucralose, acesulfame K, stevioside, thaumatin, glycyrrhizin, saccharin and dihydrochalcone. The sweeteners may be used independently, or two or more kinds may be used in combination.

The oils and fats are used as a skeletal component of the cream according to the type of the frozen dessert to be eventually produced. The oils and fats are not particularly limited and examples thereof include vegetable oils such as palm tree oil, palm oil, palm kernel oil, soybean oil and canola oil; and animal oils and fats such as lard, tallow and fish oil. It is needless to say that milk fats such as butter and cream can be also used. The oils and fats may be used independently, or two or more kinds may be used in combination.

The stabilizers moderately increase the viscosity of the frozen dessert material and prevent the oil and fat component from being separated from the frozen dessert material during the production process, storage or distribution. The stabilizers are used also for adjusting the size of the ice crystals of the cream and improving the texture of the cream. The stabilizers are not particularly limited and examples thereof include plant-derived stabilizers such as carrageenan, guar gum, Locust bean gum, microcrystalline cellulose, pectin, starch and Arabian gum; animal-derived stabilizers such as gelatin, casein and casein Na; and synthetic stabilizers such as carboxymethylcellulose (CMC) and methylcellulose. The stabilizers may be used independently, or two or more kinds may be used in combination.

The emulsifiers have a function of dispersing fat. Insufficient dispersion of fat makes it difficult to perform a sterilization process and a homogenization process well. The emulsifiers have an effect on the overrun, dryness and texture. The emulsifiers are not particularly limited and examples thereof include glycerin fatty acid ester, sorbitan fatty acid ester, sucrose fatty acid ester and propylene glycol fatty acid ester. The emulsifiers may be used independently, or two or more kinds may be used in combination.

The flavorings (flavors) are not limited as long as they give desired fragrance to the frozen dessert, and examples thereof include vanilla, chocolate, coffee, strawberry, apple, orange, grape, cinnamon, sweet melon, banana, peach, mango, mint and lemon. The flavorings may be used independently, or two or more kinds may be used in combination.

<Preparation of Frozen Dessert Material>

The frozen desserts of the present invention are produced, distributed and sold in accordance with the processes shown in the flow diagram of FIG. 1.

<Blending Process>

In the blending process, the raw materials such as water, milk, a dairy product, a sweetener, oil and fat, a stabilizer, an emulsifier, a flavoring and a water dispersion of microfibrillated cellulose are placed in a tank mixer as a blending apparatus, and uniformly stirred and mixed to give a precursor mixture referred to as "premix", which is a mix before heat sterilization. The solids fraction of the water dispersion of microfibrillated cellulose, that is, the microfibrillated cellulose content in the water dispersion of microfibrillated cellulose is not particularly limited. In the blending process, the amount of each material other than the water dispersion of microfibrillated cellulose is calculated beforehand in view of the amount, the solids fraction and the water amount of the water dispersion of microfibrillated cellulose. In the blending process, in addition, preliminary heating may be performed in order to uniformly dissolve and mix the raw materials. The temperature of the preliminary heating is not particularly limited, but 50 to 80° C. is appropriate, for example.

<Sterilization Process>

In the sterilization process (heating process), commonly known continuous heating methods such as UHT sterilization and HTST pasteurization can be employed. The sterilization method is not limited to these methods, and batch-wise or continuous indirect heating methods can be also employed, for example. The sterilization process may be performed after a homogenization process.

<Homogenization Process>

In the homogenization process, the premix prepared in the blending process is moved into a homogenizing apparatus, and milk fat, and oil and fat in the premix are crushed with the homogenizing apparatus to homogenize the premix. As the homogenizing apparatus, conventionally-known homogenizers, homomixers, colloidal mills and the like may be used. Some material mixes of frozen desserts that are free from oils and fats are completely dispersed or dissolved in the blending process. In the case of such material mixes, the homogenization process may be omitted.

Cooling Process>

In the cooling process, the mix after the heat sterilization is cooled rapidly. If the hot mix after the sterilization process is left as it is, the mix may undergo degradation and demulsification. The degradation and the demulsification of the mix are therefore avoided by rapidly cooling the mix after the sterilization process.

Hereinafter, production processes of hard ice cream will be described first, and then production processes of soft cream will be described.

<Ageing Process>

In the case where the frozen dessert material prepared is an ice cream mix, the components in the mix will be stabilized, and satisfactory ice cream will be obtained through the freezing by ageing the mix for several hours to about two days (cooling temperature: 5 to 10° C.) after the cooling process.

<Freezing Process>

The mix after the ageing process is put in a frozen dessert production apparatus (freezer) and cooled to a predetermined temperature while the mix and air are being stirred and mixed at a predetermined ratio thereby to make creamed ice cream incorporating air.

<Filling Process>

After the freezing, a desired amount of the completed ice cream is put in a desired container using a filling machine.

Conventionally-known packaging containers in line with the purpose may be used as the container being filled.

Examples of the container material include, but are not limited to, cup containers, bulk containers, pillow containers and standing pouches with the use of processed paper and plastic materials. As the filling machine, commonly-known apparatuses may be used according to the application.

The ice cream put in a container may be further packaged.

<Hardening Process (Hardening)>

Hardening is performed to freeze the ice cream after completion of the filling process. The hardening may be performed using commonly-known equipment to cool and harden the ice cream. Examples of the method thereof include, but are not limited to, a method by applying cold air at −30° C. to −40° C. and a method by using the vaporization heat of liquid nitrogen. Rapid freezing is desirable since the hardening speed has an effect on the growth of ice crystals of the ice cream during the hardening process.

<Storage, Distribution and Sale>

The ice cream hardened is kept frozen, distributed, delivered to each store, and then placed in a freezing cabinet and sold.

In FIG. 1, the words "Hard ice creams" indicate production of ice creams under the category of hard ice cream, and the words "ice confections" indicate production of ice confections under the category of hard ice cream. They are produced in the substantially same manner. In the case of raw materials that are completely dispersed or dissolved in the blending process, the homogenization process and the ageing process can be omitted.

Next, production processes of the soft cream will be described.

<Filling Process>

In the case where the frozen dessert is soft cream, a desired amount of a soft cream mix which has been cooled is put in a desired container using a filling machine. Conventionally-known packaging containers in line with the purpose may be used as the container being filled. Examples of the container include, but are not limited to, Tetra Pak cartons and Gable top cartons with the use of processed paper; and pillow containers and bags for bag-in-boxes (BIBs) with the use of plastic materials. As the filling machine, commonly-known apparatuses may be used according to the application. The filling may be performed under aseptic conditions or under non-aseptic conditions. In the case where the filling is performed under aseptic conditions, long-term distribution and storage under normal temperature are possible. Examples of the filling machine to be used under aseptic conditions include, but are not limited to, aseptic filling machines available from Tetra Pak International S.A. The soft cream mix put in a container may be further packaged. Examples of the packaging include, but are not limited to, packing in a cardboard box.

The soft cream mix packed in a box is stored with or without refrigeration, distributed with or without refrigeration and delivered to each store.

The production of ice confections under the category of soft cream is substantially the same as the production of ice creams under the category of soft cream as shown in FIG. 1. In the case of raw materials that are completely dispersed or dissolved in the blending process, the homogenization process and the ageing process can be omitted.

<Production of Frozen Dessert>

The soft cream mix prepared in a factory is packed in the factory and delivered to each store. The soft cream mix is then put into a frozen dessert production apparatus at a store, and cooled and prepared into a creamed state incorporating air as described above. The soft cream mix does not go through the hardening process and is sold face to face while in a soft state.

EXAMPLES

Hereinafter, examples of the present invention will be described. However, the present invention is not limited thereto.

(Preparation of Mix Base for Soft Cream of Ice Cream Standard)

Sugars, dairy products, emulsifiers, stabilizers and the other components, and water were used as raw materials at the ratios of the raw materials shown in Table 2, and a mix base for soft cream of the ice cream standard (hereinafter, may be referred to as soft cream mix base (ice cream standard)) was prepared. Sugar and starch syrup were used as the sugars, butter and skim milk powder were used as the dairy products, cellulose, casein Na and thickening polysaccharides were used as the stabilizers, and vanilla flavoring and a carotenoid pigment were used as the other components.

TABLE 2

| Ingredients | % by weight |
| --- | --- |
| Sugars | 13.2 |
| Dairy Products | 20.0 |
| Emulsifiers | 0.7 |
| Stabilizers | 0.4 |
| Other Components | 0.1 |
| Water | 65.6 |
| Total Amount | 100.0 |
| Milk Fat | 8.0 |
| Milk Solid | 18.1 |

(Preparation of Mix Base for Soft Cream of Lacto-Ice Standard)

Sugars, a dairy product, oils and fats, emulsifiers, stabilizers and the other components, and water were used as raw materials at the ratios of the raw materials shown in Table 3, and a mix base for soft cream of the lacto-ice standard (hereinafter, may be referred to as soft cream mix base (lacto-ice standard)) was prepared. Sugar and starch syrup were used as the sugars, skim milk powder was used as the dairy product, coconut oil and palm oil were used as the oils and fats, cellulose, casein Na and thickening polysaccharides were used as the stabilizers, and vanilla flavoring and a carotenoid pigment were used as the other components.

TABLE 3

| Ingredients | % by weight |
| --- | --- |
| Sugars | 17.6 |
| Dairy Products | 6.4 |
| Oils and Fats | 5.6 |
| Emulsifiers | 0.5 |
| Stabilizers | 0.5 |
| Other Components | 0.2 |
| Water | 69.2 |
| Total Amount | 100.00 |

(Preparation of Mix Base for Soft Cream of Fat-Free Ice Confection Standard)

Pureed strawberry, sugars, a dairy product, a stabilizer and the other components, and water were used as raw materials at the ratios of the raw materials shown in Table 4, and a mix base for soft cream of the fat-free ice confection standard (hereinafter, may be referred to as soft cream mix base (fat-free ice confection standard)) was prepared. Sugar and starch syrup were used as the sugars, whey powder was used as the dairy product, thickening polysaccharides were used as the stabilizer, and a flavoring and a coloring agent were used as the other components.

TABLE 4

| Ingredients | % by weight |
| --- | --- |
| Pureed Strawberry | 23.1 |
| Sugars | 20.9 |
| Dairy Products | 1.8 |
| Stabilizers | 0.2 |
| Other Components | 0.2 |
| Water | 53.8 |
| Total Amount | 100.0 |

(Preparation of Mix Base for Hard Ice Cream of Ice Cream Standard)

Sugars, dairy products, emulsifiers, stabilizers and the other components, and water were used as raw materials at the ratios of the raw materials shown in Table 5, and a mix base for hard ice cream of the ice cream standard (hereinafter, may be referred to hard ice cream (ice cream standard)) was prepared. Sugar and starch syrup were used as the sugars, butter and skim milk powder were used as the dairy products, cellulose, casein Na and thickening polysaccharides were used as the stabilizers, and a vanilla flavoring and a carotenoid pigment were used as the other components.

TABLE 5

| Ingredients | % by weight |
| --- | --- |
| Sugars | 13.2 |
| Dairy Products | 20.0 |
| Emulsifiers | 0.7 |
| Stabilizers | 0.4 |
| Other Components | 0.1 |
| Water | 65.6 |
| Total Amount | 100.0 |
| Milk Fat | 8.0 |
| Milk Solid | 18.1 |

Example 1

In Example 1, microfibrillated cellulose of the microfibrillated cellulose (D standard) was used and studied. As an example of the microfibrillated cellulose (D standard), commercially available CELISH (registered trademark) FD-100G manufactured by Daicel Finechem Ltd. was used, and as described later, soft cream of the ice cream standard (hereinafter, may be referred to as soft cream (ice cream standard)) of Example 1A, soft cream of the lacto-ice standard (hereinafter, may be referred to as soft cream (lacto-ice standard)) of Example 1B, soft cream of the fat-free ice confection standard (hereinafter, may be referred to as soft cream (fat-free ice confection standard)) of Example 1C, and hard ice cream of the ice cream standard (hereinafter, may be referred to as hard ice cream (ice cream standard)) of Example 1D were produced.

The solids fraction (microfibrillated cellulose content) of CELISH FD-100G was measured to be 10% by weight. The specific surface area of the microfibrillated cellulose in CELISH FD-100G was measured to be 101 $m^2/g$, and the water retention thereof was measured to be 367%. The viscosity of the water dispersion of microfibrillated cellulose when the solids fraction of CELISH FD-100G was adjusted to 0.5% by weight was measured at 5.2° C. to be 170 cP. The rate of sedimentation when the solids fraction was adjusted to 0.05% by weight was measured to be 1360 ml/g. The light transmission at a wavelength of 600 nm when the solids fraction was adjusted to 0.02% by weight was measured to be 36.4%. Table 6 shows the measurement results.

TABLE 6

| | Microfibrillated Cellulose (D standard) |
| --- | --- |
| Specific Surface Area ($m^2/g$) | 101 |
| Water Retention (%) | 367 |
| Viscosity (cP) | 170 |
| Temperature | 5.2° C. |
| Rate of Sedimentation (ml/g) | 1360 |
| Light Transmission (%) | 36.4 |

Example 1A

A soft cream mix (ice cream standard) of Example 1A was prepared by mixing the above-mentioned CELISH FD-100G with the soft cream mix base (ice cream standard) shown in Table 2 so that the microfibrillated cellulose content would be 0.1% by weight. The ratios of the raw materials are shown in Table 7.

Figure 2:
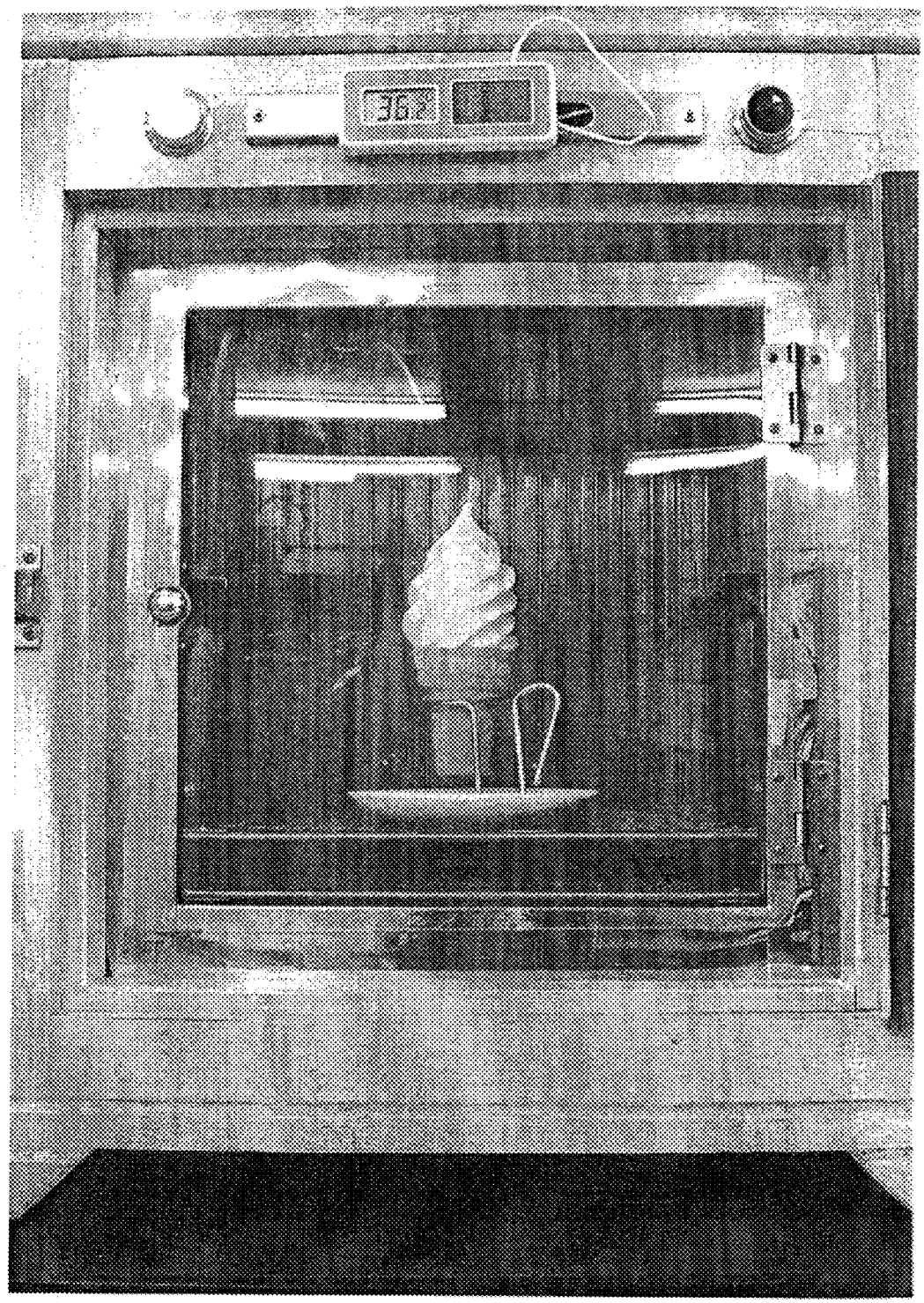
FIG. 2 is a photograph showing Example 1 while the time until melting and falling of a frozen dessert (soft cream) of the present invention is being measured after production.

Subsequently, 1.7 L of the soft cream mix of Example 1A was put into a frozen dessert production apparatus (freezer NA6462WE, product by Nissei Co., Ltd.) One hour after the start of freezing, approximately 110 g (approximately 140 ml) of soft cream was taken out and served on a cone cup (No. 15 cone, product by Nissei Co., Ltd.) by twisting upward the soft cream three and a half turns to give the soft cream (ice cream standard) of Example 1A. The overrun of the resulting soft cream was 43%, and the product temperature when the product was taken out of the freezer was −5.2° C. Throughout the present specification, the "product temperature when the product was taken out of the freezer" refers to the temperature of the soft cream immediately after the serving. Immediately after the production, the soft cream of Example 1A was put in an incubator maintained at 35° C., and the cone cup was supported in an upright position with a cup holder on a plate in the incubator as shown in FIG. 2. The door was closed so that external air would not enter, and the soft cream of Example 1A was observed as it melted and fell. In doing so, the time from when the soft cream of Example 1A was put in the incubator until when the soft cream on the cone cup melted and fell onto the plate was measured.

In addition, the soft cream of Example 1A was eaten, and the quality of the soft cream in terms of texture, mouth feel and flavor was studied. The results are shown in Table 8.

Example 1B

Soft cream of Example 1B was produced in the same manner as in Example 1A by mixing the above-mentioned CELISH FD-100G with the soft cream mix base (lacto-ice standard) shown in Table 3 so that the microfibrillated cellulose content would be 0.1% by weight and preparing a soft cream mix (lacto-ice standard) of Example 1B. The overrun of the resulting soft cream was 42%, and the product temperature when the product was taken out of the freezer was −5.1° C. The ratios of the raw materials of the soft cream mix (lacto-ice standard) of Example 1B are shown in Table 7.

The time until melting and falling of the soft cream of Example 1B was measured in the same manner as in Example 1A. In addition, the soft cream of Example 1B was eaten, and the texture, mouth feel and flavor thereof were studied. The results are shown in Table 8.

Example 1C

Soft cream (fat-free ice confection standard) of Example 1C was produced in the same manner as in Example 1A by mixing the above-mentioned CELISH FD-100G with the soft cream mix base shown in Table 4 so that the microfibrillated cellulose content would be 0.1% by weight and preparing a soft cream mix (fat-free ice confection standard) of Example 1C. The overrun of the resulting soft cream was 50%, and the product temperature when the product was taken out of the freezer was −5.8° C. The ratios of the raw materials of the soft cream mix of Example 1C are shown in Table 7.

The time until melting and falling of the soft cream of Example 1C was measured in the same manner as in Example 1A. In addition, the soft cream of Example 1C was eaten, and the texture, mouth feel and flavor thereof were studied. The results are shown in Table 8.

Example 1D

A hard ice cream mix (ice cream standard) of Example 1D was prepared by mixing the above-mentioned CELISH FD-100G with the hard ice cream mix base (ice cream standard) shown in Table 5 so that the microfibrillated cellulose content would be 0.3% by weight.

The ratios of the raw materials of the mix for the hard ice cream of Example 1D are shown in Table 7.

Subsequently, the hard ice cream mix of Example 1D was put in a frozen dessert production apparatus (CARPIGIANI 243) and frozen so as to have an overrun of 80% to give cream having an overrun of 72% and a product temperature of −5.5° C. when the product was taken out of the freezer.

Approximately 86 g (approximately 140 ml) of the ice cream was taken out and served on a cone cup (No. 15 cone, product by Nissei Co., Ltd.) by twisting upward the ice cream three and a half turns, and then soon put in a freezer at −20° C. The ice cream was left in the freezer for 24 hours or longer to be hardened. Thus, the hard ice cream (ice cream standard) of Example 1D was produced. The product temperature after the hardening was approximately −20° C.

The time until melting and falling of the hard ice cream of Example 1D was measured in the same manner as in Example 1A. In addition, the hard ice cream of Example 1D was eaten, and the texture, mouth feel and flavor thereof were studied. The results are shown in Table 8.

Comparative Example 1A

Soft cream (ice cream standard) of Comparative Example 1A was produced in the same manner as in Example 1A except that no microfibrillated cellulose was added and only the soft cream mix base (ice cream standard) shown in Table 2 was used. The overrun of the resulting soft cream was 40%, and the product temperature when the product was taken out of the freezer was −5.2° C. The ratios of the raw materials of the soft cream mix of Comparative Example 1A are shown in Table 7.

The time until melting and falling of the soft cream of Comparative Example 1A was measured in the same manner as in Example 1A. In addition, the soft cream of Comparative Example 1A was eaten, and the texture, mouth feel and flavor thereof were studied. The results are shown in Table 8.

Comparative Example 1B

Soft cream (lacto-ice standard) of Comparative Example 1B was produced in the same manner as in Example 1B except that no microfibrillated cellulose was added and only the soft cream mix base (lacto-ice standard) shown in Table 3 was used. The overrun of the resulting soft cream was 48%, and the product temperature when the product was taken out of the freezer was −5.4° C. The ratios of the raw materials of the soft cream mix of Comparative Example 1B are shown in Table 7.

The time until melting and falling of the soft cream of Comparative Example 1B was measured in the same manner as in Example 1B. In addition, the soft cream of Comparative Example 1B was eaten, and the texture, mouth feel and flavor thereof were studied. The results are shown in Table 8.

Comparative Example 1C

Soft cream (fat-free ice confection standard) of Comparative Example 1C was produced in the same manner as in Example 1C except that no microfibrillated cellulose was added and only the soft cream mix base (fat-free ice confection standard) shown in Table 4 was used. The overrun of the resulting soft cream was 46%, and the product temperature when the product was taken out of the freezer was −8.0° C. The ratios of the raw materials of the soft cream mix of Comparative Example 1C are shown in Table 7.

The time until melting and falling of the soft cream of Comparative Example 1C was measured in the same manner as in Example 1C. In addition, the soft cream of Example 1C was eaten, and the texture, mouth feel and flavor thereof were studied. The results are shown in Table 8.

Comparative Example 1D

Hard ice cream (ice cream standard) of Comparative Example 1D was produced in the same manner as in Example 1D except that no microfibrillated cellulose was added and only the hard ice cream mix base (ice cream standard) shown in Table 5 was used. The overrun of the resulting hard ice cream when it was taken out of the freezer was 80%, and the product temperature when the product was taken out of the freezer was −6.3° C. The product temperature after the hardening was approximately −20° C. The ratios of the raw materials of the hard ice cream mix (ice cream standard) of Comparative Example 1D are shown in Table 7.

The time until melting and falling of the hard ice cream of Comparative Example 1D was measured in the same manner as in Example 1D. In addition, the hard ice cream of Comparative Example 1D was eaten, and the texture, mouth feel and flavor thereof were studied. The results are shown in Table 8.

Comparison of the extended period of time with respect to the time until melting and falling between each Example and each corresponding Comparative Example is represented by a difference and a ratio between the time until melting and falling (average) and the extended time until melting and falling.

The extended period of time with respect to the time until melting and falling was evaluated according to the difference between the time until melting and falling of each Example (average) and that of each corresponding Comparative Example. The difference of 30 seconds to 1 minute was evaluated as "I" (effective), the difference of 1 minute to 2 minutes was evaluated as "II" (significantly effective), and the difference of 2 minutes or more was evaluated as "III" (remarkably effective).

The evaluation in the following Examples will also be made according to the above-described criteria.

TABLE 7

| | | Ice Cream Standard | | Lacto-ice Standard | | Fat-free Ice Confection Standard | | Hard Ice Cream Ice cream Standard | |
|---|---|---|---|---|---|---|---|---|---|
| | | Comparative Example 1A | Example 1A | Comparative Example 1B | Example 1B | Comparative Example 1C | Example 1C | Comparative Example 1D | Example 1D |
| Pureed Strawberry | | — | — | — | — | 23.1 | 23.1 | — | — |
| Sugars | | 13.2 | 13.1 | 17.6 | 17.5 | 20.9 | 20.8 | 13.2 | 12.9 |
| Dairy Products | | 20.0 | 20.0 | 6.4 | 6.4 | 1.8 | 1.8 | 20.0 | 20.0 |
| Oils and Fats | | — | — | 5.6 | 5.6 | — | — | — | — |
| Emulsifiers | | 0.7 | 0.7 | 0.5 | 0.5 | — | — | 0.7 | 0.7 |
| Stabilizers | | 0.4 | 0.4 | 0.5 | 0.5 | 0.2 | 0.2 | 0.4 | 0.4 |
| Other Components | | 0.1 | 0.1 | 0.2 | 0.2 | 0.2 | 0.2 | 0.1 | 0.1 |
| Water | Amount to add | — | 1.0 | — | 1.0 | — | 1.0 | — | 3.0 |
| Dispersion of Micro-fibrillated Cellulose | (Solid Content) | — | (0.1) | — | (0.1) | — | (0.1) | — | (0.3) |
| | (Water Content) | — | (0.9) | — | (0.9) | — | (0.9) | — | (2.7) |
| | CM | — | No | — | No | — | No | — | No |
| | Degree of Etherification | — | — | — | — | — | — | — | — |
| Water | | 65.6 | 64.7 | 69.2 | 68.3 | 53.8 | 52.9 | 65.6 | 62.9 |
| Total Amount (% by weight) | | 100.0 | 100.0 | 100.0 | 100.0 | 100.0 | 100.0 | 100.0 | 100.0 |

TABLE 8

| | Ice Cream Standard | | Lacto-ice Standard | | Fat-free Ice Confection Standard | | Hard Ice Cream Ice cream Standard | |
|---|---|---|---|---|---|---|---|---|
| | Comparative Example 1A | Example 1A | Comparative Example 1B | Example 1B | Comparative Example 1C | Example 1C | Comparative Example 1D | Example 1D |
| Product temperature when the product was taken out of the freezer (° C.) | −5.2 | −5.2 | −5.4 | −5.1 | −8.0 | −5.8 | −6.3 | −5.5 |
| Overrun (%) | 40 | 43 | 48 | 42 | 46 | 50 | 80 | 72 |
| Texture, mouth feel and flavor | Good | Good | Good | Good | Good | Good | Good | Good |
| Time until melting and falling (1st measurement) | 5'20" | 6'00" | 7'20" | 11'26" | 17'10" | 17'20" | 23'52" | 26'47" |
| Time until melting and falling (2nd measurement) | 4'50" | 6'20" | 8'10" | 9'50" | 13'10" | 16'40" | 23'29" | 29'36" |
| Time until melting and falling (average) | 5'05" | 6'10" | 7'45" | 10'38" | 15'10" | 17'00" | 23'41" | 28'12" |
| Extended period of time with respect to the time until melting and falling | — | 1'05" | — | 2'53" | — | 1'50" | — | 4'31" |
| Ratio of extended time until melting and falling | 1.0 | 1.2 | 1.0 | 1.4 | 1.0 | 1.1 | 1.0 | 1.2 |
| Effect Evaluation | — | II | — | III | — | II | — | III |

* Hard ice cream was hardened after taken out of the freezer and had an end product temperature of approximately −20° C.

The results of Examples 1A to 1D have confirmed a significant melting and falling delaying effect in the soft cream of any standard and in the hard ice cream (ice cream standard) owing to the use of the material mixes containing the microfibrillated cellulose (D standard).

Example 2

Frozen desserts of Examples 2A to 2C different in microfibrillated cellulose (D standard) content were produced and tested in such manners as described below.

In the water dispersion of microfibrillated cellulose of Example 2, as in the case of Example 1, commercially available CELISH (registered trademark) FD-100G manufactured by Daicel Finechem Ltd. was used as an example of the "microfibrillated cellulose D standard".

Example 2A

Three types of mixes for soft cream of the ice cream standard which are different in content of the microfibrillated cellulose (D standard) used in Example 1 were prepared (Examples 2A1 to 2A3).

The content of the microfibrillated cellulose (D standard) used in Example 1 was 0.1% by weight in Example 2A1, 0.2% by weight in Example 2A2, and 0.3% by weight in Example 2A3.

The ratios of the raw materials of the soft cream mixes (ice cream standard) of Example 2A are shown in Table 9.

The time until melting and falling of the soft cream of Example 2A was measured in the same manner as in Example 1A. In addition, the soft cream of Example 2A was eaten, and the texture, mouth feel and flavor thereof were studied. The results are shown in Table 10. Table 10 also shows the data of Comparative Example 1A for comparison.

TABLE 9

| | | Ice Cream Standard Microfibrillated Cellulose (D standard) | | |
|---|---|---|---|---|
| | | Example 2A1 | Example 2A2 | Example 2A3 |
| Microfibrillated Cellulose Content (% by weight) | | 0.1 | 0.2 | 0.3 |
| Sugars | | 13.1 | 13.0 | 12.9 |
| Dairy Products | | 20.0 | 20.0 | 20.0 |
| Emulsifiers | | 0.7 | 0.7 | 0.7 |
| Stabilizers | | 0.4 | 0.4 | 0.4 |
| Other Components | | 0.1 | 0.1 | 0.1 |
| Water Dispersion of Microfibrillated Cellulose | Amount to add | 1.0 | 2.0 | 3.0 |
| | (Solid Content) | (0.1) | (0.2) | (0.3) |
| | (Water Content) | (0.9) | (1.8) | (2.7) |
| | CM | No | No | No |
| | Degree of Etherification | — | — | — |
| Water | | 64.7 | 63.8 | 62.9 |
| Total Amount | | 100.0 | 100.0 | 100.0 |

TABLE 10

| | Ice Cream Standard Microfibrillated Cellulose (D standard) | | | |
|---|---|---|---|---|
| | Comparative Example 1A | Example 2A1 | Example 2A2 | Example 2A3 |
| Microfibrillated Cellulose Content (% by weight) | — | 0.1 | 0.2 | 0.3 |
| Product temperature when the product was taken out of the freezer (° C.) | −5.2 | −5.2 | −4.9 | −5.2 |
| Overrun (%) | 40 | 43 | 40 | 39 |
| Texture, mouth feel and flavor | Good | Good | Good | Good |
| Time until melting and falling (1$^{st}$ measurement) | 5'20" | 6'00" | 7'00" | 8'50" |
| Time until melting and falling (2$^{nd}$ measurement) | 4'50" | 6'20" | 6'10" | 8'00" |
| Time until melting and falling (average) | 5'05" | 6'10" | 6'35" | 8'25" |
| Extended period of time with respect to the time until melting and falling | — | 1'05" | 1'30" | 3'20" |
| Ratio of extended time until melting and falling | 1.0 | 1.2 | 1.3 | 1.7 |
| Effect Evaluation | — | II | II | III |

The results of Examples 2A1 to 2A3 indicate that the soft cream (ice cream standard) having a microfibrillated cellulose (D standard) content of 0.1% or more had a significant melting and falling delaying effect. In practical use, it is most appropriate to add approximately 0.3% by weight of the microfibrillated cellulose in terms of the costs and the thickening of the material mix.

Example 2B

Three types of mixes for soft cream of the lacto-ice standard which are different in content of CELISH FD-100G used in Example 1 were prepared (Examples 2B1 to 2B3).

The content of the microfibrillated cellulose (D standard) used in Example 1 was 0.07% by weight in Example 2B1, 0.1% by weight in Example 2B2, and 0.2% by weight in Example 2B3.

The ratios of the raw materials of the soft cream mixes (lacto-ice standard) of Example 2B are shown in Table 11.

The time until melting and falling of the soft cream (lacto-ice standard) of Example 2B was measured in the same manner as in Example 1A.

In addition, the soft cream of Example 2B was eaten, and the texture, mouth feel and flavor thereof were studied. The results are shown in Table 12.

Table 12 also shows the data of Comparative Example LB for comparison.

TABLE 11

| | Lacto-ice Standard | | | |
|---|---|---|---|---|
| Ingredients | Comparative Example 1B | Example 1B1 | Example 1B2 | Example 1B3 |
| Sugars | 17.6 | 17.5 | 17.5 | 17.4 |
| Dairy Products | 6.4 | 6.4 | 6.4 | 6.4 |
| Oils and Fats | 5.6 | 5.6 | 5.6 | 5.6 |
| Emulsifiers | 0.5 | 0.5 | 0.5 | 0.5 |
| Stabilizers | 0.5 | 0.5 | 0.5 | 0.5 |
| Other Components | 0.2 | 0.2 | 0.2 | 0.2 |

TABLE 11-continued

| | | Lacto-ice Standard | | | |
|---|---|---|---|---|---|
| Ingredients | | Comparative Example 1B | Example 1B1 | Example 1B2 | Example 1B3 |
| Water Dispersion of Microfibrillated Cellulose | Amount to add | — | 0.7 | 1.0 | 2.0 |
| | (Solid Content) | — | (0.07) | (0.10) | (0.20) |
| | (Water Content) | — | (0.63) | (0.9) | (1.8) |
| | CM | — | No | No | No |
| | Degree of Etherification | — | — | — | — |
| Water | | 69.2 | 68.6 | 68.3 | 67.4 |
| Total Amount (% by weight) | | 100.0 | 100.0 | 100.0 | 100.0 |

TABLE 12

| | Lacto-ice Standard Microfibrillated Cellulose (D standard) | | | |
|---|---|---|---|---|
| | Comparative Example 1B | Example 2B1 | Example 2B2 | Example 2B3 |
| Microfibrillated Cellulose Content (% by weight) | — | 0.07 | 0.1 | 0.2 |
| Product temperature when the product was taken out of the freezer (° C.) | −5.4 | −5.1 | −5.1 | −5.2 |
| Overrun (%) | 48 | 46 | 42 | 40 |
| Texture, mouth feel and flavor | Good | Good | Good | Good |
| Time until melting and falling (1st measurement) | 7'20" | 7'50" | 11'26" | 10'00" |
| Time until melting and falling (2nd measurement) | 8'10" | 8'40" | 9'50" | 10'10" |
| Time until melting and falling (average) | 7'45" | 8'15" | 10'38" | 10'05" |
| Extended period of time with respect to the time until melting and falling | — | 0'30" | 2'53" | 2'20" |
| Ratio of extended time until melting and falling | 1.0 | 1.1 | 1.4 | 1.3 |
| Effect Evaluation | — | I | III | III |

The results of Examples 2B1 to 2B3 indicate that the soft cream (lacto-ice standard) having a microfibrillated cellulose (D standard) content of 0.07% or more had a melting and falling delaying effect on the frozen desserts. In practical use, it is most appropriate to add approximately 0.1% by weight of the microfibrillated cellulose in terms of the costs and the thickening of the material mix.

Example 2C

Two types of mixes for soft cream of the fat-free ice confection standard which are different in content of CELISH FD-100G used in Example 1 were prepared (Examples 2C1 and 2C2).

The content of the microfibrillated cellulose (D standard) used in Example 1 was 0.1% by weight in Example 2C1 and 0.2% by weight in Example 2C2.

The ratios of the raw materials of the soft cream mixes of Example 2C are shown in Table 13.

The time until melting and falling of the soft cream of Example 2C was measured in the same manner as in Example 1A.

In addition, the soft cream of Example 2C was eaten, and the texture, mouth feel and flavor thereof were studied. The results are shown in Table 14.

Table 14 also shows the data of Comparative Example 1C for comparison.

TABLE 13

| | | Fat-free Ice Confection Standard Microfibrillated Cellulose (D standard) | |
|---|---|---|---|
| | | Example 2C1 | Example 2C2 |
| Microfibrillated Cellulose Content (% by weight) | | 0.1 | 0.2 |
| Pureed Strawberry | | 23.1 | 23.1 |
| Sugars | | 20.8 | 20.7 |
| Dairy Products | | 1.8 | 1.8 |
| Stabilizers | | 0.2 | 0.2 |
| Other Components | | 0.2 | 0.2 |
| Water Dispersion of Microfibrillated Cellulose | Amount to add | 1.0 | 2.0 |
| | (Solid Content) | (0.1) | (0.2) |
| | (Water Content) | (0.9) | (1.8) |
| | CM | No | No |
| | Degree of Etherification | — | — |
| Water | | 52.9 | 52.0 |
| Total Amount | | 100.0 | 100.0 |

TABLE 14

| | Fat-free Ice Confection Standard | | |
|---|---|---|---|
| | Comparative | Microfibrillated Cellulose (D standard) | |
| | Example 1C | Example 2C1 | Example 2C2 |
| Microfibrillated Cellulose Content (% by weight) | — | 0.1 | 0.2 |
| Product temperature when the product was taken out of the freezer (° C.) | −8.0 | −5.8 | −7.3 |
| Overrun (%) | 46 | 50 | 49 |
| Texture, mouth feel and flavor | Good | Good | Good |
| Time until melting and falling (1st measurement) | 17'10" | 17'20" | 19'39" |
| Time until melting and falling (2nd measurement) | 13'10" | 16'40" | 20'13" |
| Time until melting and falling (average) | 15'10" | 17'00" | 19'56" |
| Extended period of time with respect to the time until melting and falling | — | 1'50" | 4'46" |
| Ratio of extended time until melting and falling | 1.0 | 1.1 | 1.3 |
| Effect Evaluation | — | II | III |

The results of Examples 2C1 and 2C2 indicate that the soft cream (fat-free ice confection standard) having a microfibrillated cellulose (D standard) content of 0.1% or more had a significant melting and falling delaying effect on the frozen desserts. In practical use, it is most appropriate to add approximately 0.2% by weight of the microfibrillated cellulose in terms of the costs and the thickening of the material mix.

Example 3

In Example 3, microfibrillated cellulose of the "microfibrillated cellulose K standard" was used and the tests were performed.

As the microfibrillated cellulose (K standard), a water dispersion of non-carboxymethylated microfibrillated cellulose derived from a never-dried pulp obtained using hinoki cypress wood flour as a raw material through defatting, lignin removal, hemicellulose removal and fibrillation steps was prepared under the following conditions.

[Defatting Step]

Hinoki cypress wood flour was put in a filter paper thimble, and the filter paper thimble was placed in a flask of a Soxhlet extractor containing a mixed solution of toluene and ethanol (toluene:ethanol=2:1). The flask was placed in a hot water bath for 6 hours to extract and separate fat from the hinoki cypress wood flour. The defatted product was dried to give defatted wood flour.

[Lignin Removal Step]

In a beaker containing 600 ml of distilled water, 4 g of sodium chlorite and 0.8 g of acetic acid, 10 g of the defatted wood flour was placed, and the beaker was placed in a hot water bath at 70 to 80° C. for 1 hour under occasional stirring. Thereafter, without cooling, 4 g of sodium chlorite and 0.8 g of acetic acid were added to further perform the heating in the hot water bath, and this process was repeated five times. Thereafter, the resulting delignified pulp was collected by suction filtration and washed with purified water repeatedly until the filtrate turned from yellow to transparent and colorless.

[Hemicellulose Removal Step]

In a beaker, 300 ml of a mixture of 10 g of the delignified pulp (in solids content equivalents) and a 5% by weight sodium hydroxide aqueous solution was prepared, and the beaker was placed in a hot water bath at 90° C. for 2 hours. Thereafter, the resulting pulp from which hemicellulose was removed was collected by suction filtration and washed with purified water repeatedly until the pH of the filtrate was confirmed to be neutral to give a never-dried pulp.

[Fibrillation Step]

The never-dried pulp was fibrillated under the following conditions, and a water dispersion of microfibrillated cellulose was obtained.

<Fibrillation Conditions>

Fibrillating apparatus used: a stone mill type grinder (Serendipiter, model: MKCA6-3) and grindstones (model: MKG-C) available from Masuko Sangyo Co., Ltd Rotation speed of grindstones: 1500 rpm Other: Fibrillation was performed by further pressing the grindstones by 620 µm after they were in friction Example 3A The solids fraction (microfibrillated cellulose content) of the water dispersion of the microfibrillated cellulose of Example 3A obtained as described above was measured to be 0.97% by weight.

The specific surface area of the microfibrillated cellulose (K standard) in the water dispersion of the microfibrillated cellulose of Example 3A was measured to be 168 m²/g, and the water retention thereof was measured to be 8196%.

The solids fraction of the water dispersion of the microfibrillated cellulose of Example 3A was adjusted to 0.5% by weight, and the viscosity thereof at a temperature of 5.3° C. was measured to be 170 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 62.7%. The parameters of the microfibrillated cellulose (K standard) in Example 3A are shown in Table 15. A soft cream mix (ice cream standard) of Example 3A was prepared by mixing the water dispersion of the microfibrillated cellulose of Example 3A with the soft cream mix base (ice cream standard) shown in Table 2 so that the solids fraction of the microfibrillated cellulose of Example 3A would be 0.1% by weight. The ratios of the raw materials of the soft cream mix (ice cream standard) of Example 3A are shown in Table 16.

Subsequently, soft cream (ice cream standard) of Example 3A was produced in the same manner as in Example 1A.

The overrun of the resulting soft cream was 38%, and the product temperature was −5.8° C.

Then, the time until melting and falling of the soft cream of Example 3A was measured in the same manner as in Example 1A.

In addition, the soft cream of Example 3A was eaten, and the texture, mouth feel and flavor thereof were studied. The results are shown in Table 17.

Table 17 also shows the data of Comparative Example 1A for comparison with Example 3A.

Example 3B

A water dispersion of microfibrillated cellulose of Example 3B having a solids fraction of 0.73% was prepared in the same manner as in Example 3A.

The specific surface area of the microfibrillated cellulose (K standard) of Example 3B was measured to be 232 m²/g, and the water retention thereof was measured to be 12057%.

The solids fraction of the water dispersion of microfibrillated cellulose containing the microfibrillated cellulose (K standard) of Example 3B was adjusted to 0.5% by weight, and the viscosity thereof at a temperature of 6.0° C. was measured to be 3140 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 80.8%. The parameters of the microfibrillated cellulose (K standard) in Example 3B are shown in Table 15.

Soft cream (lacto-ice standard) of Example 3B was produced in the same manner as in Example 3A by mixing the above-mentioned water dispersion of microfibrillated cellulose with the soft cream mix base (lacto-ice standard) shown in Table 3 so that the microfibrillated cellulose content would be 0.1% by weight and preparing a soft cream mix (lacto-ice standard) of Example 3B. The overrun of the resulting soft cream was 40%, and the product temperature when the product was taken out of the freezer was −5.3° C. The ratios of the raw materials of the soft cream mix (lacto-ice standard) of Example 3B are shown in Table 16.

The time until melting and falling of the soft cream of Example 3B was measured in the same manner as in Example 3A. In addition, the soft cream of Example 3B was eaten, and the texture, mouth feel and flavor thereof were studied. The results are shown in Table 17. Table 17 also shows the data of Comparative Example 1B for comparison with Example 3B.

Example 3C

Soft cream (fat-free ice confection standard) of Example 3C was produced in the same manner as in Example 3A by mixing the microfibrillated cellulose (K standard) used in Example 3A with the soft cream mix base (fat-free ice confection standard) shown in Table 4 so that the microfibrillated cellulose (K standard) content would be 0.1% by weight and preparing a soft cream mix (fat-free ice confection standard) of Example 3C. The overrun of the resulting soft cream was 48%, and the product temperature was −7.5° C. The ratios of the raw materials of the soft cream mix (fat-free ice confection standard) of Example 3C are shown in Table 16. The time until melting and falling of the soft cream of Example 3C was measured in the same manner as in Example 3A.

In addition, the soft cream of Example 3C was eaten, and the texture, mouth feel and flavor thereof were studied. The results are shown in Table 17. Table 17 also shows the data of Comparative Example 1C for comparison with Example 3C.

Example 3D

A hard ice cream mix (ice cream standard) of Example 3D was prepared by mixing the water dispersion of microfibrillated cellulose used in Example 3A with the hard ice cream mix base (ice cream standard) shown in Table 5 so that the microfibrillated cellulose (K standard) content would be 0.3% by weight.

The hard ice cream mix of Example 3D was frozen in the same manner as in Example 1D to give ice cream (ice cream standard) having an overrun of 71% and a product temperature of −5.5° C. when the product was taken out of the freezer.

Approximately 86 g (approximately 140 ml) of the ice cream was taken out and served on a cone cup (No. 15 cone, product by Nissei Co., Ltd.) by twisting upward the ice cream three and a half turns, and then soon put in a freezer at −20° C. The ice cream was left in the freezer for 24 hours to be hardened. Thus, the hard ice cream of Example 3D was produced. The product temperature after the hardening was approximately −20° C.

The ratios of the raw materials the hard ice cream mix of Example 3D are shown in Table 16.

The time until melting and falling of the hard ice cream of Example 3D was measured in the same manner as in Example 3A. In addition, the hard ice cream of Example 3D was eaten, and the texture, mouth feel and flavor thereof were studied. The results are shown in Table 17. Table 17 also shows the data of Comparative Example 1D for comparison with Example 3D.

TABLE 15

|  | Microfibrillated Cellulose (K standard) Never-dried | |
| --- | --- | --- |
|  | Example 3A, 3C, 3D | Example 3B |
| Specific Surface Area (m²/g) | 168 | 232 |
| Water Retention (%) | 8196 | 12057 |
| Viscosity (cP) | 170 | 3140 |
| Temperature | 5.3° C. | 6.0° C. |
| Rate of Sedimentation (ml/g) | 2000 | 2000 |
| Light Transmission (%) | 62.7 | 80.8 |

TABLE 16

| | | Ice Cream Standard | | Lacto-ice Standard | | Fat-free Ice Confection Standard | | Hard Ice Cream Ice cream Standard | |
| --- | --- | --- | --- | --- | --- | --- | --- | --- | --- |
| Ingredients | | Comparative Example 1A | Example 3A | Comparative Example 1B | Example 3B | Comparative Example 1C | Example 3C | Comparative Example 1D | Example 3D |
| Pureed Strawberry | | — | — | — | — | 23.1 | 23.1 | — | — |
| Sugars | | 13.2 | 13.1 | 17.6 | 17.5 | 20.9 | 20.8 | 13.2 | 12.9 |
| Dairy Products | | 20.0 | 20.0 | 6.4 | 6.4 | 1.8 | 1.8 | 20.0 | 20.0 |
| Oils and Fats | | — | — | 5.6 | 5.6 | — | — | — | — |
| Emulsifiers | | 0.7 | 0.7 | 0.5 | 0.5 | — | — | 0.7 | 0.7 |
| Stabilizers | | 0.4 | 0.4 | 0.5 | 0.5 | 0.2 | 0.2 | 0.4 | 0.4 |
| Other Components | | 0.1 | 0.1 | 0.2 | 0.2 | 0.2 | 0.2 | 0.1 | 0.1 |
| Water Dispersion of Microfibrillated Cellulose | Amount to add | — | 10.3 | — | 13.7 | — | 10.3 | — | 30.8 |
| | (Solid Content) | — | (0.1) | — | (0.1) | — | (0.1) | — | (0.3) |
| | (Water Content) | — | (10.2) | — | (13.6) | — | (10.2) | — | (30.5) |
| | CM | — | No | — | No | — | No | — | No |
| | Degree of Etherificatio | — | — | — | — | — | — | — | — |
| Water | | 65.6 | 55.4 | 69.2 | 55.6 | 53.8 | 43.6 | 65.6 | 35.1 |
| Total Amount (% by weight) | | 100.0 | 100.0 | 100.0 | 100.0 | 100.0 | 100.0 | 100.0 | 100.0 |

TABLE 17

| | Ice Cream Standard | | Lacto-ice Standard | | Fat-free Ice Confection Standard | | Hard Ice Cream Ice cream Standard | |
| --- | --- | --- | --- | --- | --- | --- | --- | --- |
| | Comparative Example 1A | Example 3A | Comparative Example 1B | Example 3B | Comparative Example 1C | Example 3C | Comparative Example 1D | Example 3D |
| Product temperature when the product was taken out of the freezer (° C.) | −5.2 | −5.8 | −5.4 | −5.3 | −8.0 | −7.5 | −6.3 | −5.5 |
| Overrun (%) | 40 | 38 | 48 | 40 | 46 | 48 | 80 | 71 |
| Texture, mouth feel and flavor | Good | Good | Good | Good | Good | Good | Good | Good |

TABLE 17-continued

| | Ice Cream Standard | | Lacto-ice Standard | | Fat-free Ice Confection Standard | | Hard Ice Cream Ice cream Standard | |
|---|---|---|---|---|---|---|---|---|
| | Comparative Example 1A | Example 3A | Comparative Example 1B | Example 3B | Comparative Example 1C | Example 3C | Comparative Example 1D | Example 3D |
| Time until melting and falling (1st measurement) | 5'20" | 7'10" | 7'20" | 13'40" | 17'10" | 19'50" | 23'52" | 35'25" |
| Time until melting and falling (2nd measurement) | 4'50" | 6'40" | 8'10" | 14'20" | 13'10" | 19'30" | 23'29" | 28'53" |
| Time until melting and falling (average) | 5'05" | 6'55" | 7'45" | 14'00" | 15'10" | 19'40" | 23'41" | 32'09" |
| Extended period of time with respect to the time until melting and falling | — | 1'50" | — | 6'15" | — | 4'30" | — | 8'28" |
| Ratio of extended time until melting and falling | 1.0 | 1.4 | 1.0 | 1.8 | 1.0 | 1.3 | 1.0 | 1.4 |
| Effect Evaluation | — | II | — | III | — | III | — | III |

* Hard ice cream was hardened after taken out of the freezer and had an end product temperature of approximately −20° C.

The results of Examples 3A to 3D have confirmed that a significant effect of delaying melting and falling of the frozen dessert was obtained in the soft cream of any standard and the hard ice cream (ice cream standard) that contain the microfibrillated cellulose (K standard) derived from a never-dried pulp. In addition, comparison with the results of Example 1 has confirmed that a better melting and falling delaying effect was obtained in the soft cream of any standard and the hard ice cream (ice cream standard) that contain the microfibrillated cellulose (K standard) derived from a never-dried pulp than in those containing the microfibrillated cellulose (D standard).

Example 4

Frozen desserts of Examples 4B1 to 4B4 different in content of non-carboxymethylated microfibrillated cellulose (K standard) derived from a never-dried pulp were produced and tested in such manners as described below.

A water dispersion of microfibrillated cellulose containing non-carboxymethylated microfibrillated cellulose (K standard) derived from a never-dried pulp was prepared in the same manner as in Example 3.

The solids fraction of the resulting water dispersion of the non-carboxymethylated microfibrillated cellulose derived from a never-dried pulp of Example 4 was measured to be 0.73% by weight.

The specific surface area of the non-carboxymethylated microfibrillated cellulose derived from a never-dried pulp of Example 4 was measured to be 260 m²/g, and the water retention thereof was measured to be 5338%.

The solids fraction of the water dispersion of the non-carboxymethylated microfibrillated cellulose derived from a never-dried pulp of Example 4A was adjusted to 0.5% by weight, and the viscosity thereof at a temperature of 5.0° C. was measured to be 1330 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 66.6%.

The parameters of the non-carboxymethylated microfibrillated cellulose (K standard) derived from a never-dried pulp in Example 4 are shown in Table 18.

TABLE 18

| | Microfibrillated Cellulose (K standard) Never-dried |
|---|---|
| Specific Surface Area (m²/g) | 260 |
| Water Retention (%) | 5338 |
| Viscosity (cP) | 1330 |
| Temperature | 5.0° C. |
| Rate of Sedimentation (ml/g) | 2000 |
| Light Transmission (%) | 66.6 |

Soft cream mixes (lacto-ice standard) each having a content of non-carboxymethylated microfibrillated cellulose (K standard) derived from a never-dried pulp of 0.05% by weight (Example 4B1), 0.07% by weight (Example 4B2), 0.1% by weight (Example 4B3) or 0.2% by weight (Example 4B4) were prepared in the same manner as in Example 2B except that a water dispersion of the non-carboxymethylated microfibrillated cellulose derived from a never-dried pulp of Example 4 was used instead of the microfibrillated cellulose (D standard) used in Example 1.

The ratios of the raw materials of the soft cream mixes (lacto-ice standard) of Example 4B is shown in Table 19.

The time until melting and falling of the soft cream of Example 4B was measured in the same manner as in Example 1A.

In addition, the soft cream of Example 4B was eaten, and the texture, mouth feel and flavor thereof were studied. The results are shown in Table 20.

Table 20 also shows the data of Comparative Example 1B for comparison.

TABLE 19

| | Lacto-ice Standard Microfibrillated Cellulose (K standard)Never-dried | | | |
|---|---|---|---|---|
| | Example 4B1 | Example 4B2 | Example 4B3 | Example 4B4 |
| Microfibrillated Cellulose Content (% by weight) | 0.05 | 0.07 | 0.1 | 0.2 |
| Sugars | 17.6 | 17.5 | 17.5 | 17.4 |
| Dairy Products | 6.4 | 6.4 | 6.4 | 6.4 |
| Oils and Fats | 5.6 | 5.6 | 5.6 | 5.6 |
| Emulsifiers | 0.5 | 0.5 | 0.5 | 0.5 |
| Stabilizers | 0.5 | 0.5 | 0.5 | 0.5 |

TABLE 19-continued

| | | Lacto-ice Standard Microfibrillated Cellulose (K standard)Never-dried | | | |
|---|---|---|---|---|---|
| | | Example 4B1 | Example 4B2 | Example 4B3 | Example 4B4 |
| Other Components | | 0.2 | 0.2 | 0.2 | 0.2 |
| Water Dispersion of Microfibrillated Cellulose | Amount to add | 6.85 | 9.59 | 13.70 | 27.40 |
| | (Solid Content) | (0.05) | (0.07) | (0.10) | (0.20) |
| | (Water Content) | (6.80) | (9.52) | (13.6) | (27.20) |
| | CM | — | — | — | — |
| | Degree of Etherification | — | — | — | — |
| Water | | 62.35 | 59.71 | 55.60 | 42.00 |
| Total Amount (% by weight) | | 100.0 | 100.0 | 100.0 | 100.0 |

TABLE 20

| | Lacto-ice Standard | | | | |
|---|---|---|---|---|---|
| | Comparative Example 1B | Example 4B1 | Example 4B2 | Example 4B3 | Example 4B4 |
| Microfibrillated Cellulose Content (% by weight) | — | 0.05 | 0.07 | 0.1 | 0.2 |
| Product temperature when the product was taken out of the freezer (° C.) | −5.4 | −5.1 | −5.2 | −5.7 | −5.0 |
| Overrun (%) | 48 | 42 | 40 | 40 | 41 |
| Texture, mouth feel and flavor | Good | Good | Good | Good | Good |
| Time until melting and falling (1$^{st}$ measurement) | 7'20" | 10'20" | 10'40" | 14'20" | 16'00" |
| Time until melting and falling (2$^{nd}$ measurement) | 8'10" | 8'00" | 14'20" | 14'40" | 18'20" |
| Time until melting and falling (average) | 7'45" | 9'10" | 12'30" | 14'30" | 17'10" |
| Extended period of time with respect to the time until melting and falling | — | 1'25" | 4'45" | 6'45" | 9'25" |
| Ratio of extended time until melting and falling | 1.0 | 1.2 | 1.6 | 1.9 | 2.2 |
| Effect evaluation | — | II | III | III | III |

The results of Examples 4B to 4B4 have confirmed a significant effect of delaying melting and falling of the soft cream in the soft cream non-carboxymethylated microfibrillated cellulose (K standard) derived from a never-dried pulp. In practical use, it is most appropriate to add approximately 1.0% by weight of the microfibrillated cellulose (K standard) in terms of the costs and the thickening of the material mix.

In addition, comparison with the results of Example 2B has confirmed that a better melting and falling delaying effect was obtained in the soft cream containing the microfibrillated cellulose (K standard) derived from a never-dried pulp added at a certain concentration than in the soft cream containing the microfibrillated cellulose (D standard) added at the same concentration.

Example 5

Carboxymethylated microfibrillated cellulose (K standard) derived from a never-dried pulp was prepared in such a manner as described below, and frozen desserts of Examples 5A to 5E were produced using the cellulose and tested.

Example 5A

A never-dried pulp was obtained in the same manner as in Example 3. Thereafter, an aqueous solution was prepared for the CM by mixing 5.8 parts by weight of sodium monochloroacetate and 67.5 parts by weight of purified water, 16.7 parts by weight of the never-dried pulp (solid content: 11.9%) was put in the aqueous solution under stirring, and the stirring was carried out at room temperature for 30 minutes. Thereafter, 10 parts by weight of a 30% sodium hydroxide aqueous solution was added under continued stirring, and the stirring was carried out at room temperature for 30 minutes. Then, the solution was heated at 70° C. for 1 hour and cooled to 30° C., and subsequently neutralized to pH 7.0 to 7.5 with acetic acid (the stirring was terminated at this point). Thereafter, the carboxymethylated pulp was collected by suction filtration and washed with purified water several times.

The resulting carboxymethylated pulp was fibrillated in the same manner as in Example 3, and a water dispersion of the carboxymethylated microfibrillated cellulose of Example 5A was obtained.

The solids fraction of the resulting water dispersion of the carboxymethylated microfibrillated cellulose of Example 5A was measured to be 1.61% by weight.

The specific surface area of the carboxymethylated microfibrillated cellulose (K standard) of Example 5A was measured to be 247 m$^2$/g, the water retention thereof was measured to be 15632%, and the degree of etherification was measured to be 0.06.

The solids fraction of the water dispersion of the carboxymethylated microfibrillated cellulose of Example 5A was adjusted to 0.5% by weight, and the viscosity thereof at a temperature of 5.8° C. was measured to be 325 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 92.4%. The parameters of the carboxymethylated microfibrillated cellulose (K standard) in Example 5A are shown in Table 21.

A soft cream mix (ice cream standard) of Example 5A was prepared by mixing the water dispersion of the carboxymethylated microfibrillated cellulose of Example 5 with the soft cream mix base (ice cream standard) shown in Table 2 so that the content of the carboxymethylated microfibrillated cellulose of Example 5A would be 0.1% by weight. The ratios of the raw materials of the soft cream mix of Example 5A are shown in Table 22.

Subsequently, soft cream (ice cream standard) of Example 5A was produced in the same manner as in Example 1A using the soft cream mix of Example 5A. The overrun of the resulting soft cream was 39%, and the product temperature when the product was taken out of the freezer was −5.0° C.

The time until melting and falling of the soft cream of Example 5A was measured in the same manner as in Example 1A. In addition, the soft cream of Example 5A was eaten, and the texture, mouth feel and flavor thereof were studied. The results are shown in Table 23. Tables 22 and 23 also show the data of Comparative Example 1A for comparison with Example 5A.

Example 5B

A water dispersion of carboxymethylated microfibrillated cellulose of Example 5B was prepared in the same manner as in Example 5A.

The solids fraction of the resulting carboxymethylated microfibrillated cellulose (K standard) of Example 5B was 0.82% by weight.

The specific surface area of the carboxymethylated microfibrillated cellulose (K standard) of Example 5B was measured to be 267 m$^2$/g, the water retention thereof was measured to be 14209%, and the degree of etherification was measured to be 0.06.

The solids fraction of the water dispersion of microfibrillated cellulose containing the carboxymethylated microfibrillated cellulose (K standard) of Example 5B was adjusted to 0.5% by weight, and the viscosity thereof at a temperature of 5.5° C. was measured to be 2170 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 85.8%. The parameters of the carboxymethylated microfibrillated cellulose (K standard) in Example 5B are shown in Table 21.

TABLE 21

| | Microfibrillated Cellulose (K standard) Never-dried + Carboxymethylated | |
|---|---|---|
| | Example 5A, 5C, 5D, 5E | Example 5B |
| Specific Surface Area (m$^2$/g) | 247 | 267 |
| Water Retention (%) | 15632 | 14209 |
| Viscosity (cP) | 325 | 2170 |
| Temperature | 5.8° C. | 5.5° C. |
| Rate of Sedimentation (ml/g) | 2000 | 2000 |
| Light Transmission (%) | 92.4 | 85.8 |
| Degree of Etherification (DS) | 0.06 | 0.06 |

A soft cream mix (lacto-ice standard) of Example 5B was prepared by mixing the water dispersion of the microfibrillated cellulose of Example 5B with the soft cream mix base (lacto-ice standard) shown in Table 3 so that the carboxymethylated microfibrillated cellulose content would be 0.1% by weight. The ratios of the raw materials of the soft cream mix of Example 5B are shown in Table 22.

Subsequently, soft cream (lacto-ice standard) of Example 5B was produced in the same manner as in Example 5A using the soft cream mix of Example 5B. The overrun of the resulting soft cream was 41%, and the product temperature when the product was taken out of the freezer was −5.3° C.

The time until melting and falling of the soft cream of Example 5B was measured in the same manner as in Example 5A. In addition, the soft cream of Example 5B was eaten, and the texture, mouth feel and flavor thereof were studied. The results are shown in Table 23. Tables 22 and 23 also show the data of Comparative Example 1B for comparison with Example 5B.

Example 5C

Soft cream (fat-free ice confection standard) of Example 5C was produced by mixing the water dispersion of the carboxymethylated microfibrillated cellulose used in Example 5A with the soft cream mix base (fat-free ice confection standard) shown in Table 4 so that the microfibrillated cellulose (K standard) content would be 0.1% by weight. The ratios of the raw materials of the soft cream mix of Example 5C are shown in Table 22.

Subsequently, soft cream of Example 5C was produced in the same manner as in Example 5A using the soft cream mix of Example 5C. The overrun of the resulting soft cream (fat-free ice confection standard) was 45%, and the product temperature when the product was taken out of the freezer was −6.3° C.

The time until melting and falling of the soft cream of Example 5C was measured in the same manner as in Example 5A. In addition, the soft cream of Example 5C was eaten, and the texture, mouth feel and flavor thereof were studied. The results are shown in Table 23. Tables 22 and 23 also show the data of Comparative Example 1C for comparison with Example 5C.

Example 5D

A hard ice cream mix (ice cream standard) of Example 5D was prepared by mixing the water dispersion of the microfibrillated cellulose used in Example 5A with the hard ice cream mix base (ice cream standard) shown in Table 5 so that the microfibrillated cellulose content would be 0.3% by weight. The ratios of the raw materials of the hard ice cream mix of Example 5D are shown in Table 22.

The hard ice cream mix of Example 5D was frozen in the same manner as in Example 1D to give ice cream having an overrun of 78% and a product temperature of −6.3° C. when the product was taken out of the freezer.

Approximately 86 g (approximately 140 ml) of the ice cream was taken out and served on a cone cup (No. 15 cone, product by Nissei Co., Ltd.) by twisting upward the ice cream three and a half turns, and then soon put in a freezer at −20° C. The ice cream was left in the freezer for 24 hours to be hardened. Thus, the hard ice cream (ice cream standard) of Example 5D was produced. The product temperature after the hardening was approximately −20° C.

The time until melting and falling of the hard ice cream of Example 5D was measured in the same manner as in Example 5A. In addition, the hard ice cream of Example 5D was eaten, and the texture, mouth feel and flavor thereof were studied. The results are shown in Table 23. Tables 22 and 23 also show the data of Comparative Example 1D for comparison with Example 5D.

Example 5E

A high overrun soft cream mix (ice cream standard) of Example 5E was prepared by mixing the water dispersion of the carboxymethylated microfibrillated cellulose of Example 5A with the soft cream mix base (ice cream standard) shown in Table 5 so that the carboxymethylated microfibrillated cellulose (K standard) content would be 0.1% by weight.

The high overrun soft cream mix of Example 5E was frozen in the same manner as in Example 1D to give high overrun soft cream (ice cream standard) having an overrun of 79% and a product temperature of −6.1° C. when the product was taken out of the freezer.

The ratios of the raw materials of the high overrun soft cream mix of Example 5E are shown in Table 22.

The time until melting and falling of the high overrun soft cream (ice cream standard) of Example 5E was measured in the same manner as in Example 5A.

In addition, the soft cream of Example 5E was eaten, and the texture, mouth feel and flavor thereof were studied. The results are shown in Table 23. Table 23 also shows the data of Comparative Example 5 for comparison with Example 5E.

Comparative Example 5

A soft cream mix (ice cream standard) containing no microfibrillated cellulose was prepared in the same manner as in Comparative Example 1A.

The high overrun soft cream mix of Comparative Example 5 was frozen in the same manner as in Example 5E to give high overrun soft cream (ice cream standard).

The overrun of the resulting soft cream of Comparative Example 5 was 80%, and the product temperature when the product was taken out of the freezer was −5.8° C. The time until melting and falling of the soft cream of Comparative Example 5 was measured in the same manner as in Example 5A. In addition, the soft cream of Comparative Example 5 was eaten, and the texture, mouth feel and flavor thereof were studied. The results are shown in Table 23.

TABLE 22

| | | Ice Cream Standard | | Lacto-ice Standard | | Fat-free Ice Confection Standard | | Hard Ice Cream Ice cream Standard | | High Overrun Soft Cream Ice cream Standard | |
|---|---|---|---|---|---|---|---|---|---|---|---|
| Ingredients | | Comparative Example 1A | Example 5A | Comparative Example 1B | Example 5B | Comparative Example 1C | Example 5C | Comparative Example 1D | Example 5D | Comparative Example 5 | Example 5E |
| Pureed Strawberry | | — | — | — | — | 23.1 | 23.1 | — | — | — | — |
| Sugars | | 13.2 | 13.1 | 17.6 | 17.5 | 20.9 | 20.8 | 13.2 | 12.9 | 13.2 | 13.1 |
| Dairy Products | | 20.0 | 20.0 | 6.4 | 6.4 | 1.8 | 1.8 | 20.0 | 20.0 | 20.0 | 20.0 |
| Oils and Fats | | — | — | 5.6 | 5.6 | — | — | — | — | — | — |
| Emulsifiers | | 0.7 | 0.7 | 0.5 | 0.5 | — | — | 0.7 | 0.7 | 0.7 | 0.7 |
| Stabilizers | | 0.4 | 0.4 | 0.5 | 0.5 | 0.2 | 0.2 | 0.4 | 0.4 | 0.4 | 0.4 |
| Other Components | | 0.1 | 0.1 | 0.2 | 0.2 | 0.2 | 0.2 | 0.1 | 0.1 | 0.1 | 0.1 |
| Water Dispersion of Microfibrillated Cellulose | Amount to add | — | 6.2 | — | 12.2 | — | 6.2 | — | 18.6 | — | 6.2 |
| | (Solid Content) | — | (0.1) | — | (0.1) | — | (0.1) | — | (0.3) | — | (0.1) |
| | (Water Content) | — | (6.1) | — | (12.1) | — | (6.1) | — | (18.3) | — | (6.1) |
| | CM | — | Yes | — | Yes | — | Yes | — | Yes | — | Yes |
| | Degree of Etherification | — | 0.06 | — | 0.06 | — | 0.06 | — | 0.06 | — | 0.06 |
| Water | | 65.6 | 59.5 | 69.2 | 57.1 | 53.8 | 47.7 | 65.6 | 47.3 | 65.6 | 59.5 |
| Total Amount (% by weight) | | 100.0 | 100.0 | 100.0 | 100.0 | 100.0 | 100.0 | 100.0 | 100.0 | 100.0 | 100.0 |

TABLE 23

| | Ice Cream Standard | | Lacto-ice Standard | | Fat-free Ice Confection Standard | | Hard Ice Cream Ice cream Standard | | High Overrun Soft Cream Ice cream Standard | |
|---|---|---|---|---|---|---|---|---|---|---|
| | Comparative Example 1A | Example 5A | Comparative Example 1B | Example 5B | Comparative Example 1C | Example 5C | Comparative Example 1D | Example 5D | Comparative Example 5 | Example 5E |
| Product temperature when the product was taken out of the freezer (° C.) | −5.2 | −5.0 | −5.4 | −5.3 | −8.0 | −6.3 | −6.3 | −6.3 | −5.8 | −6.1 |
| Overrun (%) | 40 | 39 | 48 | 41 | 46 | 45 | 80 | 78 | 80 | 79 |
| Texture, mouth feel and flavor | Good | Good | Good | Good | Good | Good | Good | Good | Good | Good |

TABLE 23-continued

|  | Ice Cream Standard | | Lacto-ice Standard | | Fat-free Ice Confection Standard | | Hard Ice Cream Ice cream Standard | | High Overrun Soft Cream Ice cream Standard | |
| --- | --- | --- | --- | --- | --- | --- | --- | --- | --- | --- |
|  | Comparative Example 1A | Example 5A | Comparative Example 1B | Example 5B | Comparative Example 1C | Example 5C | Comparative Example 1D | Example 5D | Comparative Example 5 | Example 5E |
| Time until melting and falling (1st measurement) | 5'20" | 7'00" | 7'20" | 22'00" | 17'10" | 26'00" | 23'52" | 43'26" | 6'32" | 11'35" |
| Time until melting and falling (2nd measurement) | 4'50" | 9'40" | 8'10" | 23'00" | 13'10" | 22'20" | 23'29" | 37'40" | 5'21" | 11'38" |
| Time until melting and falling (average) | 5'05" | 8'20" | 7'45" | 22'30" | 15'10" | 24'10" | 23'41" | 40'33" | 5'57" | 11'37" |
| Extended period of time with respect to the time until melting and falling | — | 3'15" | — | 14'45" | — | 9'00" | — | 16'52" | — | 5'40" |
| Ratio of extended time until melting and falling | 1.0 | 1.6 | 1.0 | 2.9 | 1.0 | 1.6 | 1.0 | 1.7 | 1.0 | 2.0 |
| Effect Evaluation | — | III | — | III | — | III | — | III | — | III |

* Hard ice cream was hardened after taken out of the freezer and had an end product temperature of approximately −20° C The results of Examples 5A to 5E have confirmed that a significant effect of delaying melting and falling of the frozen dessert was obtained in the soft cream of any standard and the hard ice cream (ice cream standard) that contain the carboxymethylated microfibrillated cellulose (K standard). The results of Example 5E has confirmed that a significant melting and falling delaying effect was obtained also in the soft cream (ice cream standard) having a high overrun (80%). Comparison with the results of Examples 1 and 3 has confirmed that a still better melting and falling delaying effect was obtained in the soft cream of any standard and the hard ice cream (ice cream standard) that contain the carboxymethylated microfibrillated cellulose (K standard) derived from a never-dried pulp.

Example 6

Frozen desserts of Examples 6A to 6D different in content of carboxymethylated microfibrillated cellulose (K standard) derived from a never-dried pulp were produced and tested in such manners as described below.

Example 6A

Three types of mixes for soft cream of the ice cream standard which are different in content of carboxymethylated microfibrillated cellulose (K standard) derived from a never-dried pulp were prepared (Examples 6A1 to 6A3) in the same manner as in Example 2A except that the water dispersion of the microfibrillated cellulose derived from a never-dried pulp of Example 5A was used instead of the microfibrillated cellulose (D standard) used in Example 1.

The content of the carboxymethylated microfibrillated cellulose (K standard) derived from a never-dried pulp was 0.1% by weight in Example 6A1, 0.2% by weight in Example 6A2, and 0.3% by weight in Example 6A3.

The ratios of the raw materials of the soft cream mixes (ice cream standard) of Example 6A are shown in Table 24.

The time until melting and falling of the soft cream of Example 5A was measured in the same manner as in Example 1A. In addition, the soft cream of Example 5A was eaten, and the texture, mouth feel and flavor thereof were studied. The results are shown in Table 25.

Table 25 also shows the data of Comparative Example 1A for comparison.

TABLE 24

|  |  | Ice Cream Standard Microfibrillated Cellulose (K standard) Never-dried + Carboxymethylated | | |
| --- | --- | --- | --- | --- |
|  |  | Example 6A1 | Example 6A2 | Example 6A3 |
| Microfibrillated Cellulose (K standard) Content (% by weight) | | 0.1 | 0.2 | 0.3 |
| Sugars | | 13.1 | 13.0 | 12.9 |
| Dairy Products | | 20.0 | 20.0 | 20.0 |
| Emulsifiers | | 0.7 | 0.7 | 0.7 |
| Stabilizers | | 0.4 | 0.4 | 0.4 |
| Other Components | | 0.1 | 0.1 | 0.1 |
| Water Dispersion of Microfibrillated Cellulose | Amount to add | 6.2 | 12.4 | 18.6 |
| | (Solid Content) | (0.1) | (0.2) | (0.3) |
| | (Water Content) | (6.1) | (12.2) | (18.3) |
| | CM | Yes | Yes | Yes |
| | Degree of Etherification | 0.06 | 0.06 | 0.06 |
| Water | | 59.5 | 53.4 | 47.3 |
| Total Amount | | 100.0 | 100.0 | 100.0 |

TABLE 25

| | Ice Cream Standard Microfibrillated Cellulose (K standard) Never-dried + Carboxymethylated | | | |
|---|---|---|---|---|
| | Comparative Example 1A | Example 6A1 | Example 6A2 | Example 6A3 |
| Microfibrillated Cellulose (K standard) Content (% by weight) | — | 0.1 | 0.2 | 0.3 |
| Product temperature when the product was taken out of the freezer (° C.) | −5.2 | −5.0 | −5.2 | −5.0 |
| Overrun (%) | 40 | 39 | 38 | 42 |
| Texture, mouth feel and flavor | Good | Good | Good | Good |
| Time until melting and falling (1st measurement) | 5'20" | 7'00" | 13'30" | 14'30" |
| Time until melting and falling (2nd measurement) | 4'50" | 9'40" | 12'50" | 12'50" |
| Time until melting and falling (average) | 5'05" | 8'20" | 13'10" | 13'40" |
| Extended period of time with respect to the time until melting and falling | — | 3'15" | 8'05" | 8'35" |
| Ratio of extended time until melting and falling | 1.0 | 1.6 | 2.6 | 2.7 |
| Effect Evaluation | — | III | III | III |

The results of Examples 6A1 to 6A3 have confirmed a significant melting and falling delaying effect in the soft cream (ice cream standard) containing 0.1% by weight or more of the carboxymethylated microfibrillated cellulose (K standard) derived from a never-dried pulp. In practical use, it is most appropriate to add approximately 0.3% by weight of the microfibrillated cellulose in terms of the costs and the thickening of the material mix.

Example 6B

A water dispersion of carboxymethylated microfibrillated cellulose derived from a never-dried pulp of Example 6B was prepared in the same manner as in Example 5A.

The solids fraction of the resulting carboxymethylated microfibrillated cellulose (K standard) of Example 6B was 1.12% by weight.

The specific surface area of the carboxymethylated microfibrillated cellulose (K standard) of Example 6B was measured to be 263 m$^2$/g, the water retention thereof was measured to be 12247%, and the degree of etherification was measured to be 0.04.

The solids fraction of the water dispersion of microfibrillated cellulose containing the carboxymethylated microfibrillated cellulose (K standard) of Example 6B was adjusted to 0.5% by weight, and the viscosity thereof at a temperature of 5.1° C. was measured to be 970 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 89.0%. The parameters of the carboxymethylated microfibrillated cellulose (K standard) in Example 6B are shown in Table 26.

Five types of mixes for soft cream of the lacto-ice standard which are different in content of carboxymethylated microfibrillated cellulose (K standard) were prepared (Examples 6B1 to 6B5) in the same manner as in Example 2B except that the water dispersion of the microfibrillated cellulose of Example 6B was used instead of the microfibrillated cellulose (D standard) used in Example 1.

The content of the carboxymethylated microfibrillated cellulose (K standard) derived from a never-dried pulp was 0.01% by weight in Example 6B1, 0.05% by weight in Example 6B2, 0.07% by weight in Example 6B3, 0.1% by weight in Example 6B4, and 0.2% by weight in Example 6B5.

The ratios of the raw materials of the soft cream mixes (lacto-ice standard) of Example 6B are shown in Table 27.

The time until melting and falling of the soft cream (lacto-ice standard) of Example 6B was measured in the same manner as in Example 1A. In addition, the soft cream of Example 6B was eaten, and the texture, mouth feel and flavor thereof were studied. The results are shown in Table 28.

Table 28 also shows the data of Comparative Example 1B for comparison.

TABLE 26

| | Microfibrillated Cellulose (K standard) Never-dried + Carboxymethylated |
|---|---|
| Specific Surface Area (m$^2$/g) | 263 |
| Water Retention (%) | 12247 |
| Viscosity (cP) | 970 |
| Temperature | 5.1° C. |
| Rate of Sedimentation (ml/g) | 2000 |
| Light Transmission (%) | 89.0 |
| Degree of Etherification (DS) | 0.04 |

TABLE 27

| | Lacto-ice Standard Microfibrillated Cellulose (K standard) Never-dried + Carboxymethylated | | | | |
|---|---|---|---|---|---|
| | Example 6B1 | Example 6B2 | Example 6B3 | Example 6B4 | Example 6B5 |
| Microfibrillated Cellulose Content (% by wight) | 0.01 | 0.05 | 0.07 | 0.1 | 0.2 |
| Sugars | 17.6 | 17.6 | 17.5 | 17.5 | 17.4 |
| Dairy Products | 6.4 | 6.4 | 6.4 | 6.4 | 6.4 |
| Oils and Fats | 5.6 | 5.6 | 5.6 | 5.6 | 5.6 |
| Emulsifiers | 0.5 | 0.5 | 0.5 | 0.5 | 0.5 |
| Stabilizers | 0.5 | 0.5 | 0.5 | 0.5 | 0.5 |
| Other Components | 0.2 | 0.2 | 0.2 | 0.2 | 0.2 |
| Water       Amount to add | 0.89 | 4.46 | 6.25 | 8.93 | 17.86 |

TABLE 27-continued

Lacto-ice Standard Microfibrillated Cellulose (K standard) Never-dried + Carboxymethylated

|  |  | Example 6B1 | Example 6B2 | Example 6B3 | Example 6B4 | Example 6B5 |
|---|---|---|---|---|---|---|
| Dispersion of Microfibrillated Cellulose | (Solid Content) | (0.01) | (0.05) | (0.07) | (0.10) | (0.20) |
|  | (Water Content) | (0.88) | (4.41) | (6.18) | (8.83) | (17.66) |
|  | CM | Yes | Yes | Yes | Yes | Yes |
|  | Degree of Etherification | 0.04 | 0.04 | 0.04 | 0.04 | 0.04 |
| Water |  | 68.31 | 64.71 | 63.05 | 60.37 | 51.54 |
| Total Amount (% by weight) |  | 100.0 | 100.0 | 100.0 | 100.0 | 100.0 |

TABLE 28

Lacto-ice Standard Microfibrillated Cellulose (K standard) Never-dried + Carboxymethylated

|  | Comparative Example 1B | Example 6B1 | Example 6B2 | Example 6B3 | Example 6B4 | Example 6B5 |
|---|---|---|---|---|---|---|
| Microfibrillated Cellulose Content (% by wight) | — | 0.01 | 0.05 | 0.07 | 0.1 | 0.2 |
| Product temperature when the product was taken out of the freezer (° C.) | −5.4 | −4.8 | −5.0 | −5.6 | −5.4 | −5.2 |
| Overrun (%) | 48 | 42 | 43 | 41 | 44 | 42 |
| Texture, mouth feel and flavor | Good | Good | Good | Good | Good | Good |
| Time until melting and falling ($1^{st}$ measurement) | 7'20" | 13'50" | 12'40" | 15'00" | 26'00" | 28'00" |
| Time until melting and falling ($2^{nd}$ measurement) | 8'10" | 11'40" | 12'10" | 16'30" | 30'10" | 25'30" |
| Time until melting and falling (average) | 7'45" | 12'45" | 12'25" | 15'45" | 28'05" | 26'45" |
| Extended period of time with respect to the time until melting and falling | — | 5'00" | 4'40" | 8'00" | 20'20" | 19'00" |
| Ratio of extended time until melting and falling | 1.0 | 1.6 | 1.6 | 2.0 | 3.6 | 3.5 |
| Effect Evaluation | — | III | III | III | III | III |

The results of Examples 6A1 to 6B5 have confirmed a significant melting and falling delaying effect in the soft cream (lacto-ice standard) containing the carboxymethylated microfibrillated cellulose (K standard) derived from a never-dried pulp even in the case where the microfibrillated cellulose (K standard) content was 0.01% by weight.

The melting and falling delaying effect will be further improved by increasing the amount of the carboxymethylated microfibrillated cellulose (K standard) derived from a never-dried pulp to add to 0.1% by weight. In practical use, however, it is most appropriate that the content is approximately 0.2% by weight in terms of the costs and the thickening of the material mix. In addition, comparison between Example 4B and Example 6B indicates that a more significant effect of delaying melting and falling of the soft cream was obtained in the case of the carboxymethylated microfibrillated cellulose (K standard) added in a certain amount than in the case of the non-carboxymethylated microfibrillated cellulose (K standard) added in the same amount.

Example 6C

Two types of mixes for soft cream of the fat-free ice confection standard which are different in content of carboxymethylated microfibrillated cellulose derived from a never-dried pulp were prepared (Examples 6C1 and 6C2) in the same manner as in Example 2C except that the water dispersion of the carboxymethylated microfibrillated cellulose derived from a never-dried pulp of Example 5A was used instead of the microfibrillated cellulose (D standard) used in Example 1.

The content of the carboxymethylated microfibrillated cellulose derived from a never-dried pulp was 0.1% by weight in Example 6C1 and 0.2% by weight in Example 6C2.

The ratios of the raw materials of the soft cream mixes (fat-free ice confection standard) of Example 6C are shown in Table 29.

The time until melting and falling of the soft cream (fat-free ice confection standard) of Example 6C was measured in the same manner as in Example 1A. In addition, the soft cream of Example 6C was eaten, and the texture, mouth feel and flavor thereof were studied. The results are shown in Table 30.

Table 30 also shows the data of Comparative Example 1C for comparison.

TABLE 29

Fat-free Ice Confection Standard
Microfibrillated Cellulose
(Never-dried + Carboxymethylated)

| | Example 6C1 | Example 6C2 |
|---|---|---|
| Microfibrillated Cellulose Content (% by weight) | 0.1 | 0.2 |
| Pureed Strawberry | 23.1 | 23.1 |
| Sugars | 20.8 | 20.7 |
| Dairy Products | 1.8 | 1.8 |
| Stabilizers | 0.2 | 0.2 |
| Other Components | 0.2 | 0.2 |
| Water Dispersion of Microfibrillated Cellulose (Never-dried + Carboxymethylated) | 6.2 (0.1) (6.1) Yes 0.06 | 12.4 (0.2) (12.2) Yes 0.06 |
| Water | 47.7 | 41.6 |
| Total Amount | 100.6 | 100.0 |

TABLE 30

Fat-free Ice Confection Standard
Microfibrillated Cellulose
(Never-dried + Carboxymethylated)

| | Comparative Example 1C | Example 6C1 | Example 6C2 |
|---|---|---|---|
| Microfibrillated Cellulose Content (% by weight) | — | 0.1 | 0.2 |
| Product temperature when the product was taken out of the freezer | −8.0 | −6.3 | −7.6 |
| Overrun (%) | 46 | 45 | 47 |
| Texture, mouth feel and flavor | Good | Good | Good |
| Time until melting and falling (1st measurement) | 17'10" | 26'00" | 25'40" |
| Time until melting and falling (2nd measurement) | 13'10" | 22'20" | 22'50" |
| Time until melting and falling (average) | 15'10" | 24'10" | 24'15" |
| Extended period of time with respect to the time until melting and falling | — | 9'00" | 9'05" |
| Ratio of extended time until melting and falling | 1.0 | 1.6 | 1.6 |
| Effect Evaluation | — | III | III |

The results of Examples 6C1 and 6C2 have confirmed a significant effect of delaying melting and falling of the soft cream in the soft cream (fat-free ice confection standard) containing 0.1% by weight or more of the carboxymethylated microfibrillated cellulose (K standard) derived from a never-dried pulp. In practical use, it is considered most appropriate to add approximately 0.2% by weight of the microfibrillated cellulose in terms of the costs and the thickening of the material mix.

Example 6D

Three types of mixes for hard ice cream of the ice cream standard which are different in content of carboxymethylated microfibrillated cellulose (K standard) derived from a never-dried pulp were prepared (Examples 6D1 to 6D3) using the water dispersion of the carboxymethylated microfibrillated cellulose derived from a never-dried pulp of Example 5A.

The content of the carboxymethylated microfibrillated cellulose (K standard) derived from a never-dried pulp was 0.1% by weight in Example 6D1, 0.2% by weight in Example 6D2, and 0.3% by weight in Example 6D3.

The ratios of the raw materials of the hard ice cream mixes (ice cream standard) are shown in Table 31.

The hard ice cream mix (ice cream standard) of the ice cream standard of Example 6D was frozen in the same manner as in Example 1D. Approximately 86 g (approximately 140 ml) of the ice cream was taken out and served on a cone cup (No. 15 cone, product by Nissei Co., Ltd.) by twisting upward the ice cream three and a half turns, and then soon put in a freezer at −20° C. The ice cream was left in the freezer for 24 hours to be hardened. Thus, the hard ice cream (ice cream standard) of Example 6D was produced.

The time until melting and falling of the hard ice cream of the ice cream standard Example 6D was measured in the same manner as in Example 1A. In addition, the hard ice cream of the ice cream standard of Example 6D was eaten, and the texture, mouth feel and flavor thereof were studied. The results are shown in Table 32.

Table 32 also shows the data of Comparative Example 1D for comparison.

TABLE 31

Hard Ice Cream
Ice Cream Standard
Microfibrillated Cellulose
(K standard) (Never-dried + Carboxymethylated)

| | | Example 6D1 | Example 6D2 | Example 6D3 |
|---|---|---|---|---|
| Microfibrillated Cellulose Content (% by weight) | | 0.1 | 0.2 | 0.3 |
| Sugars | | 13.1 | 13.0 | 12.9 |
| Dairy Products | | 20.0 | 20.0 | 20.0 |
| Emulsifiers | | 0.7 | 0.7 | 0.7 |
| Stabilizers | | 0.4 | 0.4 | 0.4 |
| Other Components | | 0.1 | 0.1 | 0.1 |
| Water Dispersion of Microfibrillated Cellulose | Amount to add | 6.2 | 12.4 | 18.6 |
| | (Solid Content) | (0.1) | (0.2) | (0.3) |
| | (Water Content) | (6.1) | (12.2) | (18.3) |
| | CM | Yes | Yes | Yes |
| | Degree of Etherification | 0.06 | 0.06 | 0.06 |
| Water | | 59.5 | 53.4 | 47.3 |
| Total Amount | | 100.0 | 100.0 | 100.0 |

TABLE 32

Hard Ice Cream
Ice Cream Standard
Microfibrillated Cellulose
(Never-dried + Carboxymethylated)

| | Comparative Example 1D | Example 6D1 | Example 6D2 | Example 6D3 |
|---|---|---|---|---|
| Microfibrillated Cellulose Content (% by weight) | — | 0.1 | 0.2 | 0.3 |
| Product temperature when the product was taken out of the freezer (° C.) | −6.3 | −6.3 | −5.7 | −6.3 |
| Overrun (%) | 80 | 79 | 87 | 78 |
| Texture, mouth feel and flavor | Good | Good | Good | Good |
| Time until melting and falling (1st measurement) | 23'52" | 28'58" | 39'45" | 43'26" |

TABLE 32-continued

|  | Hard Ice Cream Ice Cream Standard Microfibrillated Cellulose (Never-dried + Carboxymethylated) | | | |
| --- | --- | --- | --- | --- |
|  | Comparative Example 1D | Example 6D1 | Example 6D2 | Example 6D3 |
| Time until melting and falling (2$^{nd}$ measurement) | 23'29" | 27'25" | 46'09" | 37'40" |
| Time until melting and falling (average) | 23'41" | 28'12" | 42'57" | 40'33" |
| Extended period of time with respect to the time until melting and falling | — | 4'31" | 19'16" | 16'52" |
| Ratio of extended time until melting and falling | 1.0 | 1.2 | 1.8 | 1.7 |
| Effect Evaluation | — | III | III | III |

\* Hard ice cream was hardened after taken out of the freezer and had an end product temperature of approximately −20° C.

The results of Examples 6D1 to 6D3 have confirmed a significant melting and falling delaying effect in the hard ice cream (ice cream standard) containing 0.1% by weight or more of the carboxymethylated microfibrillated cellulose (K standard) derived from a never-dried pulp.

In practical use, it is considered most appropriate to add approximately 0.2% by weight of the microfibrillated cellulose in terms of the costs and the thickening of the material mix.

Example 6E

Two types of mixes for soft cream of the ice cream standard which are different in content of carboxymethylated microfibrillated cellulose (K standard) derived from a never-dried pulp were prepared (Examples 6E1 and 6E2) using the water dispersion of the carboxymethylated microfibrillated cellulose derived from a never-dried pulp of Example 5A.

The content of the carboxymethylated microfibrillated cellulose (K standard) derived from a never-dried pulp was 0.1% by weight in Example 6E1 and 0.3% by weight in Example 6E2.

The ratios of the raw materials of the soft cream mixes are shown in Table 33.

The soft cream mix (ice cream standard) of Example 6E was frozen in the same manner as in Example 5E to give high overrun soft cream (ice cream standard).

The time until melting and falling of the high overrun soft cream of Example 6E was measured in the same manner as in Example 1A.

In addition, the high overrun soft cream of Example 6E was eaten, and the texture, mouth feel and flavor thereof were studied. The results are shown in Table 34.

Table 34 also shows the data of Comparative Example 5 for comparison.

TABLE 33

| Ingredients | | High Overrun Soft Cream Ice Cream Standard Microfibrillated Cellulose (K standard) (Never-dried + Carboxymethylated) | | |
| --- | --- | --- | --- | --- |
|  |  | Comparative Example 5 | Example 6E1 | Example 6E2 |
| Sugars | | 13.2 | 13.1 | 12.9 |
| Dairy Products | | 20.0 | 20.0 | 20.0 |
| Emulsifiers | | 0.7 | 0.7 | 0.7 |
| Stabilizers | | 0.4 | 0.4 | 0.4 |
| Other Components | | 0.1 | 0.1 | 0.1 |
| Water | Amount to add | — | 6.2 | 18.6 |
| Dispersion of Microfibrillated Cellulose | (Solid Content) | — | (0.1) | (0.3) |
| | (Water Content) | — | (6.1) | (18.3) |
| | CM | — | Yes | Yes |
| | Degree of Etherification | — | 0.06 | 0.06 |
| Water | | 65.6 | 59.5 | 47.3 |
| Total Amount | | 100.0 | 100.0 | 100.0 |

TABLE 34

|  | High Overrun Soft Cream Ice Cream Standard Microfibrillated Cellulose (K standard) (Never-dried + Carboxymethylated) | | |
| --- | --- | --- | --- |
|  | Comparative Example 5 | Example 6E1 | Example 6E2 |
| Microfibrillated Cellulose Content (% by weight) | — | 0.1 | 0.3 |
| Product temperature when the product was taken out of the freezer (° C.) | −5.8 | −6.1 | −5.7 |
| Overrun (%) | 80 | 79 | 87 |
| Texture, mouth feel and flavor | Good | Good | Good |
| Time until melting and falling (1$^{st}$ measurement) | 6'32" | 11'35" | 16'46" |
| Time until melting and falling (2$^{nd}$ measurement) | 5'21" | 11'38" | 14'23" |
| Time until melting and falling (average) | 5'57" | 11'37" | 15'35" |
| Extended period of time with respect to the time until melting and falling | — | 5'40" | 9'38" |
| Ratio of extended time until melting and falling | 1.0 | 2.0 | 2.6 |
| Effect Evaluation | — | III | III |

The results of Examples 6E1 and 6E2 have confirmed a significant effect of delaying melting and falling of the soft cream in the high overrun soft cream (ice cream standard) containing 0.1% by weight or more of carboxymethylated microfibrillated cellulose (K standard) derived from a never-dried pulp. In practical use, it is considered most appropriate to add approximately 0.3% by weight of the microfibrillated cellulose in terms of the costs and the thickening of the material mix.

Example 7

Soft cream of the lacto-ice standard of Examples 7B1 to 7B6 containing carboxymethylated microfibrillated cellulose (K standard) derived from a never-dried pulp which were varied in degree of etherification was produced and tested in such manners as described below.

Example 7B1

The carboxymethylated microfibrillated cellulose (K standard) derived from a never-dried pulp used in Example 7B1 was prepared as follows.

A never-dried pulp was obtained in the same manner as in Example 3. Thereafter, an aqueous solution was prepared for the CM by mixing 1.9 parts by weight of sodium monochloroacetate and 82.6 parts by weight of purified water, 12.2 parts by weight of the never-dried pulp (solid content: 16.4%) was put in the aqueous solution under stirring, and the stirring was carried out at room temperature for 30 minutes. Thereafter, 3.3 parts by weight of a 30% sodium hydroxide aqueous solution was added under continued stirring, and the stirring was carried out at room temperature for 30 minutes. Then, the solution was heated at 70° C. for 1 hour and cooled to 30° C., and subsequently neutralized to pH 7.0 to 7.5 with acetic acid (the stirring was terminated at this point). Thereafter, the carboxymethylated pulp was collected by suction filtration and washed with purified water several times. The resulting carboxymethylated pulp was fibrillated in the same manner as in Example 3, and a water dispersion of the carboxymethylated microfibrillated cellulose derived from a never-dried pulp of Example 7B1 was obtained.

The solids fraction of the resulting water dispersion of the carboxymethylated microfibrillated cellulose derived from a never-dried pulp of Example 7B1 was measured to be 0.77% by weight.

The degree of etherification of the carboxymethylated microfibrillated cellulose (K standard) derived from a never-dried pulp of Example 7B1 obtained as described above was 0.02.

The specific surface area of the carboxymethylated microfibrillated cellulose (K standard) of Example 7B1 was measured to be 288 m²/g, and the water retention thereof was measured to be 11612%.

The solids fraction of the water dispersion of the microfibrillated cellulose containing the carboxymethylated microfibrillated cellulose (K standard) of Example 7B1 was adjusted to 0.5% by weight, and the viscosity thereof at a temperature of 5.2° C. was measured to be 1020 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 67.9%. The parameters of the carboxymethylated microfibrillated cellulose in Example 7B1 are shown in Table 35.

Soft cream (lacto-ice standard) of Example 7B1 was produced in the same manner as in Example 1A by mixing the carboxymethylated microfibrillated cellulose (K standard) of Example 7B1 with the soft cream mix base (lacto-ice standard) shown in Table 3 so that the content of the carboxymethylated microfibrillated cellulose (K standard) derived from a never-dried pulp would be 0.1% by weight and preparing a soft cream mix (lacto-ice standard) of Example 7B1. The overrun of the resulting soft cream was 43%, and the product temperature when the product was taken out of the freezer was −5.4° C. The ratios of the raw materials of the soft cream mix of Example 7B1 are shown in Table 36.

The time until melting and falling of the soft cream of Example 7B1 was measured in the same manner as in Example 1A. In addition, the soft cream of Example 7B1 was eaten, and the texture, mouth feel and flavor thereof were studied. The results are shown in Table 37.

Example 7B2

The carboxymethylated microfibrillated cellulose (K standard) derived from a never-dried pulp used in Example 7B2 was prepared as follows.

A never-dried pulp was obtained in the same manner as in Example 3. Thereafter, an aqueous solution was prepared for the CM by mixing 3.9 parts by weight of sodium monochloroacetate and 77.2 parts by weight of purified water, 12.2 parts by weight of the never-dried pulp (solid content: 16.4%) was put in the aqueous solution under stirring, and the stirring was carried out at room temperature for 30 minutes. Thereafter, 6.7 parts by weight of a 30% sodium hydroxide aqueous solution was added under continued stirring, and the stirring was carried out at room temperature for 30 minutes. The subsequent processes were carried out in the same manner as in Example 7B1. The solids fraction of the resulting water dispersion of the carboxymethylated microfibrillated cellulose derived from a never-dried pulp of Example 7B2 was measured to be 0.78% by weight.

The degree of etherification of the carboxymethylated microfibrillated cellulose (K standard) derived from a never-dried pulp of Example 7B2 obtained as described above was 0.04.

The specific surface area of the carboxymethylated microfibrillated cellulose (K standard) of Example 7B2 was measured to be 300 m²/g, and the water retention thereof was measured to be 14032%.

The solids fraction of the water dispersion of microfibrillated cellulose containing the carboxymethylated microfibrillated cellulose (K standard) of Example 7B2 was adjusted to 0.5% by weight, and the viscosity thereof at a temperature of 5.7° C. was measured to be 1930 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 79.9%. The parameters of the carboxymethylated microfibrillated cellulose (K standard) in Example 7B2 are shown in Table 35.

Soft cream (lacto-ice standard) of Example 7B2 was produced in the same manner as in Example 1A by mixing the carboxymethylated microfibrillated cellulose (K standard) of Example 7B2 with the soft cream mix base (lacto-ice standard) shown in Table 3 so that the content of the carboxymethylated microfibrillated cellulose (K standard) derived from a never-dried pulp would be 0.1% by weight and preparing a soft cream mix (lacto-ice standard) of Example 7B2. The overrun of the resulting soft cream was 42%, and the product temperature when the product was taken out of the freezer was −5.5° C. The ratios of the raw materials of the soft cream mix of Example 7B2 are shown in Table 36. The time until melting and falling of the soft cream of Example 7B2 was measured in the same manner as in Example 1A. In addition, the soft cream of Example 7B2 was eaten, and the texture, mouth feel and flavor thereof were studied. The results are shown in Table 37.

Example 7B3

The carboxymethylated microfibrillated cellulose (K standard) derived from a never-dried pulp used in Example 5B (degree of etherification: 0.06) was used as carboxymethylated microfibrillated cellulose derived from a never-dried pulp of Example 7B3.

Soft cream (lacto-ice standard) of Example 7B3 was produced in the same manner as in Example 1A by mixing the carboxymethylated microfibrillated cellulose (K standard) of Example 5B with the soft cream mix base (lacto-ice standard) shown in Table 3 so that the content of the carboxymethylated microfibrillated cellulose (K standard) derived from a never-dried pulp would be 0.1% by weight and preparing a soft cream mix (lacto-ice standard) of Example 7B3. The overrun of the resulting soft cream was 41%, and the product temperature when the product was taken out of the freezer was −5.3° C. The ratios of the raw materials of the soft cream mix of the lacto-ice standard of Example 7B3 are shown in Table 36.

The time until melting and falling of the soft cream of Example 7B3 was measured in the same manner as in Example 1A. In addition, the soft cream of Example 7B3 was eaten, and the texture, mouth feel and flavor thereof were studied. The results are shown in Table 37.

Example 7B4

The carboxymethylated microfibrillated cellulose (K standard) derived from a never-dried pulp used in Example 7B4 was prepared as follows.

A never-dried pulp was obtained in the same manner as in Example 3. Thereafter, an aqueous solution was prepared for the CM by mixing 9.7 parts by weight of sodium monochloroacetate and 61.4 parts by weight of purified water, 12.2 parts by weight of the never-dried pulp (solid content: 16.4%) was put in the aqueous solution under stirring, and the stirring was carried out at room temperature for 30 minutes. Thereafter, 16.7 parts by weight of a 30% sodium hydroxide aqueous solution was added under continued stirring, and the stirring was carried out at room temperature for 30 minutes. The subsequent processes were carried out in the same manner as in Example 7B1. The resulting carboxymethylated pulp was fibrillated in the same manner as in Example 3, and a water dispersion of the carboxymethylated microfibrillated cellulose derived from a never-dried pulp of Example 7B4 was obtained.

The solids fraction of the resulting water dispersion of the carboxymethylated microfibrillated cellulose derived from a never-dried pulp of Example 7B4 was measured to be 1.13% by weight.

The degree of etherification of the carboxymethylated microfibrillated cellulose (K standard) derived from a never-dried pulp of Example 7B4 obtained as described above was 0.10.

The specific surface area of the carboxymethylated microfibrillated cellulose (K standard) of Example 7B4 was measured to be 273 $m^2/g$, and the water retention thereof was measured to be 17486%.

The solids fraction of the water dispersion of microfibrillated cellulose containing the carboxymethylated microfibrillated cellulose (K standard) of Example 7B4 was adjusted to 0.5% by weight, and the viscosity thereof at a temperature of 4.8° C. was measured to be 1950 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 78.0%. The parameters of the carboxymethylated microfibrillated cellulose (K standard) in Example 7B4 are shown in Table 35.

Soft cream (lacto-ice standard) of Example 7B4 was produced in the same manner as in Example 1A by mixing the carboxymethylated microfibrillated cellulose (K standard) of Example 7B4 with the soft cream mix base (lacto-ice standard) shown in Table 3 so that the content of the carboxymethylated microfibrillated cellulose (K standard) derived from a never-dried pulp would be 0.1% by weight and preparing a soft cream mix (lacto-ice standard) of Example 7B4. The overrun of the resulting soft cream was 40%, and the product temperature when the product was taken out of the freezer was −5.2° C. The ratios of the raw materials of the soft cream mix of the lacto-ice standard of Example 7B4 are shown in Table 36. The time until melting and falling of the soft cream of Example 7B4 was measured in the same manner as in Example 1A. In addition, the soft cream of Example 7B4 was eaten, and the texture, mouth feel and flavor thereof were studied. The results are shown in Table 37.

Example 7B5

The carboxymethylated microfibrillated cellulose (K standard) derived from a never-dried pulp used in Example 7B5 was prepared as follows.

A never-dried pulp was obtained in the same manner as in Example 3. Thereafter, an aqueous solution was prepared for the CM by mixing 11.7 parts by weight of sodium monochloroacetate and 56.1 parts by weight of purified water, 12.2 parts by weight of the never-dried pulp (solid content: 16.4%) was put in the aqueous solution under stirring, and the stirring was carried out at room temperature for 30 minutes. Thereafter, 20.0 parts by weight of a 30% sodium hydroxide aqueous solution was added under continued stirring, and the stirring was carried out at room temperature for 30 minutes. The subsequent processes were carried out in the same manner as in Example 7B1. The resulting carboxymethylated pulp was fibrillated in the same manner as in Example 3, and a water dispersion of the carboxymethylated microfibrillated cellulose derived from a never-dried pulp of Example 7B5 was obtained.

The solids fraction of the resulting water dispersion of the carboxymethylated microfibrillated cellulose derived from a never-dried pulp of Example 7B5 was measured to be 1.03% by weight.

The degree of etherification of the carboxymethylated microfibrillated cellulose (K standard) derived from a never-dried pulp of Example 7B5 obtained as described above was 0.13.

The specific surface area of the carboxymethylated microfibrillated cellulose (K standard) of Example 7B5 was measured to be 244 $m^2/g$, and the water retention thereof was measured to be 16071%.

The solids fraction of the water dispersion of microfibrillated cellulose containing the carboxymethylated microfibrillated cellulose (K standard) of Example 7B5 was adjusted to 0.5% by weight, and the viscosity thereof at a temperature of 5.4° C. was measured to be 1140 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 76.9%. The parameters of the carboxymethylated microfibrillated cellulose (K standard) in Example 7B5 are shown in Table 35.

Soft cream (lacto-ice standard) of Example 7B5 was produced in the same manner as in Example 1A by mixing the carboxymethylated microfibrillated cellulose (K standard) of Example 7B5 with the soft cream mix base (lacto-ice standard) shown in Table 3 so that the content of the carboxymethylated microfibrillated cellulose derived from a never-dried pulp would be 0.1% by weight and preparing a soft cream mix (lacto-ice standard) of Example 7B5. The overrun of the resulting soft cream was 42%, and the product temperature when the product was taken out of the freezer was −5.1° C. The ratios of the raw materials of the soft cream mix of Example 7B5 are shown in Table 36.

The time until melting and falling of the soft cream of Example 7B5 was measured in the same manner as in Example 1A. In addition, the soft cream of Example 7B5 was eaten, and the texture, mouth feel and flavor thereof were studied. The results are shown in Table 37.

Example 7B6

The carboxymethylated microfibrillated cellulose (K standard) derived from a never-dried pulp used in Example 7B6 was prepared as follows.

A never-dried pulp was obtained in the same manner as in Example 3. Thereafter, an aqueous solution was prepared for the CM by mixing 13.6 parts by weight of sodium monochloroacetate and 50.9 parts by weight of purified water, 12.2 parts by weight of the never-dried pulp (solid content: 16.4%) was put in the aqueous solution under stirring, and the stirring was carried out at room temperature for 30 minutes. Thereafter, 23.3 parts by weight of a 30% sodium hydroxide aqueous solution was added under continued stirring, and the stirring was carried out at room temperature for 30 minutes. The subsequent processes were carried out in the same manner as in Example 7B1. The resulting carboxymethylated pulp was fibrillated in the same manner as in Example 3, and a water dispersion of the carboxymethylated microfibrillated cellulose derived from a never-dried pulp of Example 7B6 was obtained.

The solids fraction of the resulting water dispersion of the carboxymethylated microfibrillated cellulose derived from a never-dried pulp of Example 7B6 was measured to be 0.78% by weight.

The degree of etherification of the carboxymethylated microfibrillated cellulose (K standard) derived from a never-dried pulp of Example 7B5 obtained as described above was 0.17.

The specific surface area of the carboxymethylated microfibrillated cellulose (K standard) of Example 7B6 was measured to be 336 m$^2$/g, and the water retention thereof was measured to be 18174%.

The solids fraction of the water dispersion of microfibrillated cellulose containing the carboxymethylated microfibrillated cellulose (K standard) of Example 7B6 was adjusted to 0.5% by weight, and the viscosity thereof at a temperature of 5.4° C. was measured to be 8600 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 98.2%. The parameters of the carboxymethylated microfibrillated cellulose (K standard) in Example 7B6 are shown in Table 35.

Soft cream (lacto-ice standard) of Example 7B6 was produced in the same manner as in Example 1A by mixing the carboxymethylated microfibrillated cellulose (K standard) of Example 7B6 with the soft cream mix base (lacto-ice standard) shown in Table 3 so that the content of the carboxymethylated microfibrillated cellulose derived from a never-dried pulp would be 0.1% by weight and preparing a soft cream mix (lacto-ice standard) of Example 7B6. The overrun of the resulting soft cream was 46%, and the product temperature when the product was taken out of the freezer was −5.3° C. The ratios of the raw materials of the soft cream mix of Example 7B6 are shown in Table 36.

The time until melting and falling of the soft cream of Example 7B6 was measured in the same manner as in Example 1A. In addition, the soft cream of Example 7B6 was eaten, and the texture, mouth feel and flavor thereof were studied. The results are shown in Table 37.

Comparative Example 7B

Table 37 also shows the data of Comparative Example 1B containing no microfibrillated cellulose for evaluation of the time until melting and falling.

TABLE 35

| | Microfibrillated Cellulose (K standard) (Never-dried + Carboxymethylated) | | | | | |
|---|---|---|---|---|---|---|
| | Example 7B1 | Example 7B2 | Example 7B3 | Example 7B4 | Example 7B5 | Example 7B6 |
| Degree of Etherification | 0.02 | 0.04 | 0.06 | 0.10 | 0.13 | 0.17 |
| Specific Surface Area (m$^2$/g) | 288 | 300 | 247 | 273 | 244 | 336 |
| Water Retention (%) | 11612 | 14032 | 15632 | 17486 | 16071 | 18174 |
| Viscosity (cP) | 1020 | 1930 | 325 | 1950 | 1140 | 8600 |
| Temperature | 5.2° C. | 5.7° C. | 5.8° C. | 4.8° C. | 5.4° C. | 5.4° C. |
| Rate of Sedimentation (ml/g) | 2000 | 2000 | 2000 | 2000 | 2000 | 2000 |
| Light Transmission (%) | 67.9 | 79.9 | 92.4 | 78.0 | 76.9 | 98.2 |

TABLE 36

| | | Lacto-ice Standard Microfibrillated Cellulose (K standard) Never-dried + Carboxymethylated | | | | | |
|---|---|---|---|---|---|---|---|
| | | Example 7B1 | Example 7B2 | Example 7B3 | Example 7B4 | Example 7B5 | Example 7B6 |
| Degree of Etherification | | 0.02 | 0.04 | 0.06 | 0.10 | 0.13 | 0.17 |
| Sugars | | 17.5 | 17.5 | 17.5 | 17.5 | 17.5 | 17.5 |
| Dairy Products | | 6.4 | 6.4 | 6.4 | 6.4 | 6.4 | 6.4 |
| Oils and Fats | | 5.6 | 5.6 | 5.6 | 5.6 | 5.6 | 5.6 |
| Emulsifiers | | 0.5 | 0.5 | 0.5 | 0.5 | 0.5 | 0.5 |
| Stabilizers | | 0.5 | 0.5 | 0.5 | 0.5 | 0.5 | 0.5 |
| Other Components | | 0.2 | 0.2 | 0.2 | 0.2 | 0.2 | 0.2 |
| Water | Amount to add | 13.0 | 12.8 | 12.2 | 8.8 | 9.7 | 12.8 |
| Dispersion | (Solid Content) | (0.1) | (0.1) | (0.1) | (0.1) | (0.1) | (0.1) |
| of | (Water Content) | (12.9) | (12.7) | (12.1) | (8.7) | (9.6) | (12.7) |

TABLE 36-continued

Lacto-ice Standard
Microfibrillated Cellulose (K standard)
Never-dried + Carboxymethylated

|  |  | Example 7B1 | Example 7B2 | Example 7B3 | Example 7B4 | Example 7B5 | Example 7B6 |
|---|---|---|---|---|---|---|---|
| Microfibrillated Cellulose | CM | Yes | Yes | Yes | Yes | Yes | Yes |
|  | Degree of Etherification | 0.02 | 0.04 | 0.06 | 0.1 | 0.13 | 0.17 |
|  | Water | 56.3 | 56.5 | 57.1 | 60.5 | 59.6 | 56.5 |
| Total Amount (% by weight) |  | 100.0 | 100.0 | 100.0 | 100.0 | 100.0 | 100.0 |

TABLE 37

Lacto-ice Standard

|  | Comparative Example 1B | Example 7B1 | Example 7B2 | Example 7B3 | Example 7B4 | Example 7B5 | Example 7B6 |
|---|---|---|---|---|---|---|---|
| CM | — | Yes | Yes | Yes | Yes | Yes | Yes |
| Degree of Etherification | — | 0.02 | 0.04 | 0.06 | 0.10 | 0.13 | 0.17 |
| Product temperature when the product was taken out of the freezer (° C.) | −5.4 | −5.4 | −5.5 | −5.3 | −5.2 | −5.1 | −5.3 |
| Overrun (%) | 48 | 43 | 42 | 41 | 40 | 42 | 46 |
| Texture, mouth feel and flavor | Good | Good | Good | Good | Good | Good | Good |
| Time until melting and falling (1st measurement) | 7'20" | 14'00" | 16'30" | 22'00" | 15'50" | 14'10" | 13'10" |
| Time until melting and falling (2nd measurement) | 8'10" | 14'50" | 18'10" | 23'00" | 17'20" | 13'50" | 15'00" |
| Time until melting and falling (average) | 7'45" | 14'25" | 17'20" | 22'30" | 16'35" | 14'00" | 14'05" |
| Extended period of time with respect to the time until melting | — | 6'40" | 9'35" | 14'45" | 8'50" | 6'15" | 6'20" |
| Ratio of extended time until melting and falling | 1.0 | 1.9 | 2.2 | 2.9 | 2.1 | 1.8 | 1.8 |
| Effect Evaluation | — | III | III | III | III | III | III |

The results of Examples 7E1 to 7E6 have confirmed a melting and falling delaying effect in the soft cream of the lacto-ice standard containing the carboxymethylated microfibrillated cellulose (K standard) derived from a never-dried pulp having a degree of etherification of 0.02 or more. The suitable degree of etherification is 0.04 to 0.10, and 0.06 is most suitable.

Example 8

Carboxymethylated microfibrillated cellulose (K standard) derived from a dried pulp of Example 8 was prepared in such a manner as described below, and frozen desserts of Examples 8A to 8D were produced using the cellulose and tested in the same manner as in Example 1.

A carboxymethylated pulp was obtained in the same manner as in Example 5A, and then dried by heating in an oven at 100° C. until the weight thereof no longer changed.

The resulting dried pulp was fibrillated in the same manner as in Example 3, and a water dispersion of the carboxymethylated microfibrillated cellulose derived from a dried pulp of Example 8 was obtained.

The solids fraction of the resulting water dispersion of the carboxymethylated microfibrillated cellulose derived from a dried pulp of Example 8 was measured to be 0.92% by weight.

The specific surface area of the resulting carboxymethylated microfibrillated cellulose (K standard) derived from a dried pulp of Example 8 was measured to be 240 m$^2$/g, the water retention thereof was measured to be 15605%, and the degree of etherification was measured to be 0.04.

The solids fraction of the water dispersion of microfibrillated cellulose containing the carboxymethylated microfibrillated cellulose (K standard) derived from a dried pulp of Example 8 was adjusted to 0.5% by weight, and the viscosity thereof at a temperature of 5.0° C. was measured to be 870 cP. The solids fraction of the water dispersion was adjusted to 0.05% by weight, and the rate of sedimentation was measured to be 2000 ml/g. The solids fraction of the water dispersion was adjusted to 0.02% by weight, and the light transmission at a wavelength of 600 nm was measured to be 69.6%. The parameters of the carboxymethylated microfibrillated cellulose (K standard) derived from a dried pulp in Example 8 are shown in Table 38.

Example 8A

A soft cream mix (ice cream standard) of Example 8 was prepared by mixing the water dispersion of the carboxymethylated microfibrillated cellulose derived from a dried pulp of Example 8 with the soft cream mix base (ice cream standard) shown in Table 2 so that the solids fraction of the carboxymethylated microfibrillated cellulose derived from a dried pulp of Example 8 would be 0.1% by weight. The ratios of the raw materials of the soft cream mix of Example 8A are shown in Table 39.

Subsequently, soft cream (ice cream standard) of Example 8A was produced in the same manner as in Example 1A. The overrun of the resulting soft cream was 41%, and the product temperature when the product was taken out of the freezer was −5.3° C. Then, the time until melting and falling of the soft cream of Example 8A was measured in the same manner as in Example 1A.

In addition, the soft cream of Example 8A was eaten, and the texture, mouth feel and flavor thereof were studied. The results are shown in Table 40.

Table 40 also shows the data of Comparative Example 1A for comparison with Example 8A.

Example 8B

Soft cream (lacto-ice standard) of Example 8B was produced in the same manner as in Example 1A by mixing the water dispersion of the carboxymethylated microfibrillated cellulose derived from a dried pulp of Example 8 with the soft cream mix base (lacto-ice standard) shown in Table 3 so that the content of the carboxymethylated microfibrillated cellulose (K standard) derived from a dried pulp of Example 8 would be 0.1% by weight and preparing a soft cream mix (lacto-ice standard) of Example 8B.

The overrun of the resulting soft cream was 46%, and the product temperature when the product was taken out of the freezer was −5.8° C. The ratios of the raw materials of the soft cream mix of Example 8B are shown in Table 39.

The time until melting and falling of the soft cream of Example 8B was measured in the same manner as in Example 1A. In addition, the soft cream of Example 8B was eaten, and the texture, mouth feel and flavor thereof were studied. The results are shown in Table 40. Table 40 also shows the data of Comparative Example 1B for comparison with Example 8B.

Example 8C

Soft cream (fat-free ice confection standard) of Example 8C was produced in the same manner as in Example 1A by mixing the water dispersion of the carboxymethylated microfibrillated cellulose derived from a dried pulp of Example 8 with the soft cream mix base (fat-free ice confection standard) shown in Table 4 so that the content of the carboxymethylated microfibrillated cellulose (K standard) derived from a dried pulp of Example 8 would be 0.1% by weight and preparing a soft cream mix (fat-free ice confection standard) of Example 8C.

The overrun of the resulting soft cream was 48%, and the product temperature when the product was taken out of the freezer was −7.8° C. The ratios of the raw materials of the soft cream mix of Example 8C are shown in Table 39.

The time until melting and falling of the soft cream of Example 8C was measured in the same manner as in Example 1A.

In addition, the soft cream of Example 8C was eaten, and the texture, mouth feel and flavor thereof were studied. The results are shown in Table 40. Table 40 also shows the data of Comparative Example 1C for comparison with Example 8C.

Example 8D

A hard ice cream mix (ice cream standard) of Example 8D was prepared by mixing the water dispersion of the carboxymethylated microfibrillated cellulose derived from a dried pulp of Example 8 with the hard ice cream mix base (ice cream standard) shown in Table 5 so that the microfibrillated cellulose (K standard) content would be 0.3% by weight.

The hard ice cream mix (ice cream standard) of Example 8D was frozen in the same manner as in Example 1D to give ice cream having an overrun of 79% and a product temperature of −6.2° C. when the product was taken out of the freezer.

Approximately 86 g (approximately 140 ml) of the ice cream was taken out and served on a cone cup (No. 15 cone, product by Nissei Co., Ltd.) by twisting upward the ice cream three and a half turns, and then soon put in a freezer at −20° C. The ice cream was left in the freezer for 24 hours to be hardened. Thus, the hard ice cream of Example 8D was produced. The product temperature after the hardening was approximately −20° C.

The ratios of the raw materials of the hard ice cream mix of Example 8D are shown in Table 39. The time until melting and falling of the hard ice cream of Example 8D was measured in the same manner as in Example 1A. In addition, the hard ice cream of Example 8D was eaten, and the texture, mouth feel and flavor thereof were studied. The results are shown in Table 40. Table 40 also shows the data of Comparative Example 1D for comparison with Example 8D.

TABLE 38

|  | Microfibrillated Cellulose (K standard) Dried + Carboxymethylated |
|---|---|
| Specific Surface Area (m$^2$/g) | 240 |
| Water Retention (%) | 15605 |
| Viscosity (cP) | 870 |
| Temperature | 5.0° C. |
| Rate of Sedimentation (ml/g) | 2000 |
| Light Transmission (%) | 69.6 |
| Degree of Etherification (DS) | 0.04 |

TABLE 39

|  | Ice Cream Standard | | Lacto-ice Standard | | Fat-free Ice Confection Standard | | Hard Ice Cream Ice cream Standard | |
|---|---|---|---|---|---|---|---|---|
|  | Comparative Example 1A | Example 8A | Comparative Example 1B | Example 8B | Comparative Example 1C | Example 8C | Comparative Example 1D | Example 8D |
| Pureed Strawberry | — | — | — | — | 23.1 | 23.1 | — | — |
| Sugars | 13.2 | 13.1 | 17.6 | 17.5 | 20.9 | 20.8 | 13.2 | 12.9 |
| Dairy Products | 20.0 | 20.0 | 6.4 | 6.4 | 1.8 | 1.8 | 20.0 | 20.0 |
| Oils and Fats | — | — | 5.6 | 5.6 | — | — | — | — |
| Emulsifiers | 0.7 | 0.7 | 0.5 | 0.5 | — | — | 0.7 | 0.7 |
| Stabilizers | 0.4 | 0.4 | 0.5 | 0.5 | 0.2 | 0.2 | 0.4 | 0.4 |

TABLE 39-continued

|  |  | Ice Cream Standard | | Lacto-ice Standard | | Fat-free Ice Confection Standard | | Hard Ice Cream Ice cream Standard | |
|---|---|---|---|---|---|---|---|---|---|
|  |  | Comparative Example 1A | Example 8A | Comparative Example 1B | Example 8B | Comparative Example 1C | Example 8C | Comparative Example 1D | Example 8D |
| Other Components | | 0.1 | 0.1 | 0.2 | 0.2 | 0.2 | 0.2 | 0.1 | 0.1 |
| Water Dispersion of Microfibrillated Cellulose | Amount to add | — | 10.9 | — | 10.9 | — | 10.9 | — | 32.8 |
| | (Solid Content) | — | (0.1) | — | (0.1) | — | (0.1) | — | (0.3) |
| | (Water Content) | — | (10.8) | — | (10.8) | — | (10.8) | — | (32.5) |
| | CM | — | Yes | — | Yes | — | Yes | — | Yes |
| | Degree of Etherification | — | 0.04 | — | 0.04 | — | 0.04 | — | 0.04 |
| | Water | 65.6 | 54.8 | 69.2 | 58.4 | 53.8 | 43.0 | 65.6 | 33.1 |
| Total Amount (% by weight) | | 100.0 | 100.0 | 100.0 | 100.0 | 100.0 | 100.0 | 100.0 | 100.0 |

TABLE 40

|  | Ice Cream Standard | | Lacto-ice Standard | | Fat-free Ice Confection Standard | | Hard Ice Cream Ice cream Standard | |
|---|---|---|---|---|---|---|---|---|
|  | Comparative Example 1A | Example 8A | Comparative Example 1B | Example 8B | Comparative Example 1C | Example 8C | Comparative Example 1D | Example 8D |
| Microfibrillated Cellulose Content (% by weight) | — | 0.1 | — | 0.1 | — | 0.1 | — | 0.3 |
| Product temperature when the product was taken out of the freezer (° C.) | −5.2 | −5.3 | −5.4 | −5.8 | −8.0 | −7.8 | −6.3 | −6.2 |
| Overrun (%) | 40 | 41 | 48 | 46 | 46 | 48 | 80 | 79 |
| Texture, mouth feel and flavor | Good | Good | Good | Good | Good | Good | Good | Good |
| Time until melting and falling (1st measurement) | 5'20" | 6'52" | 7'20" | 13'50" | 17'10" | 23'30" | 23'52" | 40'47" |
| Time until melting and falling (2nd measurement) | 4'50" | 8'38" | 8'10" | 13'20" | 13'10" | 21'50" | 23'29" | 35'45" |
| Time until melting and falling (average) | 5'05" | 7'45" | 7'45" | 13'35" | 15'10" | 22'40" | 23'41" | 38'16" |
| Extended period of time with respect to the time until melting and falling | — | 2'40" | — | 5'50" | — | 7'30" | — | 14'35" |
| Ratio of extended time until melting and falling | 1.0 | 1.5 | 1.0 | 1.8 | 1.0 | 1.5 | 1.0 | 1.6 |
| Effect Evaluation | — | III | — | III | — | III | — | III |

*Hard ice cream was hardened after taken out of the freezer and had an end product temperature of approximately −20° C The results of Examples 8A to 8D have confirmed that a significant effect of delaying melting and falling of the frozen dessert was obtained in the soft cream of any standard and the hard ice cream (ice cream standard) that contain the carboxymethylated microfibrillated cellulose (K standard) derived from a dried pulp. Comparison with the results of Examples 5A to 5D indicates that a better and more significant melting and falling delaying effect was obtained in the soft cream of any standard and the hard ice cream (ice cream standard) that contain the microfibrillated cellulose derived from a never-dried pulp than in those that contain the microfibrillated cellulose derived from a dried pulp.

What is claimed is:

1. A frozen dessert containing plant-derived microfibrillated cellulose, wherein the microfibrillated cellulose is chemically modified with a substituent including —$CH_2COO$— and has at least one of the parameters:
   (1) a specific surface area of 150 $m^2/g$ or larger; and
   (2) a water retention of 8500% or more.

2. A frozen dessert containing plant-derived microfibrillated cellulose, wherein the microfibrillated cell ulose is chemically modified with a substituent including —$CH_2COO$— and has at least one of the parameters:
   (1) a specific surface area of 200 $m^2/g$ or larger; and
   (2) a water retention of 8500% or more.

3. The frozen dessert according to claim 1 or 2, containing said microfibrillated cellulose and having a temperature of −4 to −40° C. as a product.

4. The frozen dessert according to claim 1 or 2, containing said microfibrillated cellulose and having a temperature of −4 to −10° C. as a product when the product is taken out of the freezer.

5. The frozen dessert according to claim 1 or 2, containing said microfibrillated cellulose and having an overrun of 20% to 100% as a product.

6. The frozen dessert according to claim 1 or 2, containing said microfibrillated cellulose and having an overrun of 20% to 80% as a product.

7. The frozen dessert according to claim 1 or 2, wherein the microfibrillated cellulose has a degree of etherification of 0.01 to 0.50.

8. The frozen dessert according to claim 1 or 2, wherein the frozen dessert comprises 0.01 to 1.0% by weight of microfibrillated cellulose chemically modified with to substituent including —$CH_2COO^-$.

9. The frozen dessert according to claim 1 or 2, wherein the microfibrillated cellulose has an α-celluose content of 50% or more.

10. The frozen dessert according to claim 1 or 2, wherein said microfibrillated cellulose contains never-dried-pulp-derived or dried-pulp-derived microfibrillated cellulose.

11. A frozen dessert material for the frozen dessert according to claim 1 or 2, wherein the material contains said microfibrillated cellulose.

12. A method for producing a frozen dessert, comprising use of the frozen dessert material according to claim 11.

\* \* \* \* \*